US006408227B1

United States Patent
Singhvi et al.

(10) Patent No.: US 6,408,227 B1
(45) Date of Patent: Jun. 18, 2002

(54) SYSTEM AND METHOD FOR CONTROLLING EFFLUENTS IN TREATMENT SYSTEMS

(75) Inventors: Sanjay S. Singhvi, Coralville; Jerald L. Schnoor, Iowa City, both of IA (US)

(73) Assignee: The University of Iowa Research Foundation, Iowa City, IA (US)

( * ) Notice: Subject to any disclaimer, the term of this patent is extended or adjusted under 35 U.S.C. 154(b) by 0 days.

(21) Appl. No.: 09/414,074

(22) Filed: Oct. 7, 1999

Related U.S. Application Data

(60) Provisional application No. 60/156,591, filed on Sep. 29, 1999.

(51) Int. Cl.[7] ................................................ G01N 31/00

(52) U.S. Cl. ........................................ 700/266; 700/32

(58) Field of Search ................................ 700/266, 268, 700/271, 273, 28, 29, 32, 33, 49, 44, 47; 210/601; 252/175

(56) References Cited

U.S. PATENT DOCUMENTS

| | | | |
|---|---|---|---|
| 4,470,911 A | 9/1984 | Reinke | 210/662 |
| 4,830,757 A | 5/1989 | Lynch et al. | 210/742 |
| 5,111,531 A | 5/1992 | Grayson et al. | 706/23 |
| 5,227,067 A | 7/1993 | Runyon | 210/606 |
| 5,353,237 A | 10/1994 | Bass et al. | 700/272 |
| 5,468,088 A | 11/1995 | Shoemaker et al. | 166/245 |

(List continued on next page.)

FOREIGN PATENT DOCUMENTS

| | | |
|---|---|---|
| DE | 29912126 U1 | 11/1999 |
| DE | 19827877 A1 | 1/2000 |
| EP | 0708390 A2 | 4/1996 |

OTHER PUBLICATIONS

Bevan et al., "Implementation Issues when Installing Control and Condition Monitoring at Water Treatment Works", 1998, IEEE, 5/1–5/4.*

(List continued on next page.)

*Primary Examiner*—Leo P. Picard
*Assistant Examiner*—Chad Rapp
(74) *Attorney, Agent, or Firm*—Fleshner & Kim, LLP

(57) ABSTRACT

A system and method is provided that predicts operational parameters for all unit operations in water treatment plants or the like. Initial training with historical operations data, for example, allows the system and method to develop equations that can in turn predict the present and future performance of the plant in real time. In addition, the system and method can control operations of the plant in real time. The system improves the performance of the plant to meet predetermined subpoints of various parameters. For example, the predetermined subpoints can be used to enable the plant to meet regulatory needs while controlling for other parameters such as cost, chemical fees, flow rates and power consumption. The system and method include a non-linear predictive model for turbidity. The system considers the influent water quality and analyzes treatment options available to predict the dose of various chemicals required to get desired treatment. It will then predict plant performance resulting from intended operator changes in real time. The system preferably includes general regression neural networks with modeling modifications to learn if the works including learning patterns to make predictions and cost for operations control of unit operations and/or the system. The system includes virtual sensors for parameters that cannot be detected on-line. The system and method determine sufficient data to monitor and control all water quality parameters in the water treatment plant. The water treatment plant operations can be predicted and controlled as a plurality of coupled unit operations. In one embodiment, a unit operation block consist of a power mixer, a rapid mix basin, flocculation basin, and settling tank controlled as a coagulation control loop.

18 Claims, 18 Drawing Sheets

U.S. PATENT DOCUMENTS

| | | | | |
|---|---|---|---|---|
| 5,505,843 A | | 4/1996 | Obuchi et al. ................. | 210/94 |
| 5,513,098 A | | 4/1996 | Spall et al. .................... | 700/38 |
| 5,547,578 A | | 8/1996 | Neilsen ...................... | 210/614 |
| 5,556,536 A | | 9/1996 | Turk .......................... | 210/150 |
| 5,581,459 A | | 12/1996 | Enbutsu et al. ............... | 700/32 |
| 5,585,001 A | | 12/1996 | Jang et al. ................... | 210/614 |
| 5,589,068 A | | 12/1996 | Nielsen ...................... | 210/614 |
| 5,646,863 A | | 7/1997 | Morton ........................ | 702/23 |
| 5,804,062 A | * | 9/1998 | Wyness ....................... | 210/86 |
| 5,870,692 A | * | 2/1999 | Millo .......................... | 702/45 |
| 5,904,855 A | * | 5/1999 | Manz et al. ................. | 210/709 |
| 6,159,365 A | * | 12/2000 | Kigel et al. ................. | 210/151 |

OTHER PUBLICATIONS

Shen et al., "Data–Driven Fuzzy Rule Induction and its Application to Sytems Monitoring", IEEE, II–928–II933.*

Valentin et al., "An Hybrid Neural Network Based System for Optimization of Coagulant Dosing in a Water Treatment Plant", 1999, IEEE, 3380–3385.*

Nix et al. "Expert Systems in Water Treatment Plant Operation" Feb. 1991, *AWWA Research Foundation Catalog* #90560, pp. 43–44.

Mulligan et al. "Genetic Algorithms for Calibrating Water Quality Models" *Journal of Environmental Engineering*, Mar. 1998, pp. 202, 204–211.

Gagnon et al. "Modelling of Coagulant Dosage in a Water Treatment Plant" *Artifcial Intelligence in Engineering* 11, Jan. 6, 1997, pp. 401–404.

Conlin et al. "Modelling Pressure Drop in Water Treatment" *Artifcial Intelligence in Engineering* 11, Jan. 2, 1997, pp. 393–400.

Boger "Application of Neural Networks to Water and Wastewater Treatment Plant Operation" ISSN vol. 31, No. 1, 1992, pp. 25–33.

Spall et al. "A Neural Network Controller for Systems with Umodeled Dynamics with Applications to Wastewater Treatment" IEEE vol. 27, No. 3, Jun. 1997, pp. 369–375.

Mirsepassi et al. "Application of Artificial Neural Networks to the Real Time Operation of Water Treatment Plants" IEEE, 1995, pp. 516–521.

Cote et al. "Dynamic Modelling of the Activated Sludge Process: Improving Prediction Using Neural Networks" Jan. 1994, Wat. Rev. vol. 29, No. 4, pp. 995–1004.

Robinson "Reliability and Risk Analysis Using Artificial Neural Networks" Progess in Neural Processing–5, Mar. 30, 1995, pp. 64–73.

Rogers et al. "Optimal Field–Scale Groundwater Remediation Using Neural Networks and the Genetic Algorithm" Environmental Science & Technology, vol. 29, No. 5, 1995 pp. 1145–1155.

Lek et al. "Application of Neural Networks to Modelling Nonlinear Relationships in Ecology", Elsevier, *Ecological Modelling* 90 (1996) pp. 39–52.

Novotny et al. "Strategy of Stochastic Real–Time Control of Wastewater Treatment Plants" ISSN, vol. 31, No. 1, 1992, pp. 73–85.

Abe "Fuzzy Systems with Learning Capability" Hitachi 319–12 Japan, pp. 102–115.

Krovvidy et al. "A Knowledge Based Neural Network Approach for Waste Water Treatment System" *University of Cincinnati, Dept. of Electrical & Computer Engineering*, pp. 1327–1332.

Collins et al. "Information Processing Coupled with Expert Systems for Water Treatment Plants" ISA Transactions, US, Instrument Society of America, Pittsburgh, vol. 31, No. 1, 1992, pp. 61–72.

Minderman, Jr. et al. "Neural Net Modeling and Control of a Municipal Waste Water Process" Proceedings of the American Control Conference, US, N.Y., IEEE, Jun. 2, 1993 pp. 1480–1484.

* cited by examiner

SYSTEM AND METHOD FOR CONTROLLING EFFLUENTS IN TREATMENT SYSTEMS

This application claims benefit of U.S. Provisional Application No. 60/156,591, filed Sep. 29, 1999.

BACKGROUND OF THE INVENTION

1. Field of the Invention

The present invention relates to control systems and methods, and in particular, treatment systems, such as a water treatment plant and methods of operating the same.

2. Background of the Related Art

Water quality is something most Americans take for granted. The public's first impression of water is aesthetically driven and is primarily determined by the visual quality of the water. Visual quality is a function of the amount of particles and color in water. Particles are finely divided solids from weathering processes and biological activity (clays, algae, bacteria, and other higher organisms) that are larger than molecules but generally not distinguishable by the naked eye. Standard methods for measuring and reporting visual quality use Turbidity and Particle Counts. Turbidity is an optical property of a sample causing light to be scattered and absorbed but not transmitted. The unit of measurement is Nephelometric Turbidity Units (NTU). Turbidity interferes with disinfection. The size, shape and refractive index of the particles suspended in the water affect the water's light-scattering properties, thus making it difficult to correlate turbidity with the concentration of particles in the water. However, the particle size distribution can be established using particle counts.

In 1993, Milwaukee, Wis. reported a sharp increase in the number of incidents of diarrhea patients caused by Cryptosporidium. Investigations revealed that the Howard Water Treatment Plant was responsible for the outbreak. Historically, the Howard Water Treatment Plant consistently produced treated water with turbidities of less than 0.1 Nephelometric Turbidity Unit (NTU). However, during the time of the incident, the finished water turbidity levels ranged from 0.1 to 1.7 NTU while the influent turbidity was normal. During this period, the effluent samples always met the Wisconsin Department of Natural Resources's regulations for turbidity.

Investigation by the Environmental Protection Agency showed that the Howard Water Treatment Plant personnel responded to turbidity changes by adjusting coagulant levels continuously to meet the demands of raw water quality (turbidity, taste, and odor). However, the dosage adjustments were not fast enough or optimum for the varying influent water quality. When the dosages reached an optimum level, the effluent turbidity came within control, demonstrating that the plant could produce low turbidity water under optimal chemical conditions. Accordingly, a system and method are needed that can predict improved or optimum chemical dosages in real time based upon influent water quality could reduce the response time or delay that can cause such incidents.

Thus, a need exists for a system and method to assure an adequate coagulant dose to reduce the influent turbidity by correlating treatment (e.g., coagulant) to turbidity.

Given the nature of the problem, it is almost essential to prevent turbidity. Breakthrough needs to be prevented rather than compensating for a monitored parameter, turbidity, or the like, breakthrough after occurrence. Parameters of secondary importance such as cost also need coordinated effective control. Given the economics, a system and method are needed to control or to optimize treatment to get maintain effective continuous effluent turbidity at a reduced or lowest chemical cost for real time process variables.

The Surface Water Treatment Rule (SWTR) establishes goals for filtration and disinfection for all surface water sources or groundwater sources under the direct influence of surface water. The SWTR and Enhanced Surface Water Treatment Rule (ESWTR) set forth criteria for treated water turbidity, disinfectant dosage, contact time, percent reduction or inactivation of Giardia cysts and enteric viruses, and monitoring requirements for Turbidity, Residual Disinfectant and percent removal of cysts.

The Surface Water Treatment Rule Guidance Manual specifies that the minimum finished water turbidities should not exceed 0.5 NTU in 95% of the samples taken every month. Because of the association of turbidity with pathogens that are difficult to disinfect like Giardia and Cryptosporidium, the Environmental Protection Agency (EPA) recommends that the filtered water turbidity before disinfection should be less than 0.1 NTU on a continuous basis. This provides greater confidence that pathogens are removed before disinfection, the last barrier in the treatment plant.

However, the Disinfectant and Disinfection Byproducts (D-DBP) Rule was introduced to regulate human carcinogenic compounds like Trihalomethanes and Haloacetic acid.

The primary purpose of Safe Drinking Water Act (SDWA) is to authorize federal oversight of public water supplies safety. SDWA gives USEPA broad authority to publish maximum contaminant level goals (MCLGs) and National Primary Drinking Water Regulations (NPDWRs) for drinking water contaminants. SDWA modifications require USEPA to publish an MCLG and promulgate an NPDWR for any contaminant that has an adverse effect on human health and is known to occur or has a substantial likelihood of occurring in public water systems at a frequency and at concentrations of public health concerns.

MSLGs are nonenforceable, health based goals. They represent a level at which there is no known or anticipated health effect on human health without regard to the cost of reaching these goals. Maximum Contaminant levels are the enforceable goals. They are set as close to the MCLG as feasible taking into account the best technology, treatment techniques, and other available means (taking cost into consideration).

The provisions of SDWA could increase the amount of regulated substances. Some of these newly regulated substances may require improved treatment techniques or a more complex treatment. Further, the SWTR, ESWTR and D-DBP set targets for removal or percent reduction of contaminants. These requirements may force the water treatment plants to improve the current operations or add new facilities to comply with the rules. Monitoring and reporting requirements under these rules are stringent to enforce compliance with the rules at all times.

In addition, the requirements under the different rules may conflict or lead to inherent violation. For example, SWTR disinfection requirements may force a water utility to maintain a higher disinfectant level, but this may cause violation of the D-DBP Rule requirements. Operators of water treatment plants have to continuously meet the requirements under several different rules simultaneously while operating the plant in a cost-effective manner. This task becomes especially challenging under rapidly varying raw water conditions. A real time control system and method is needed to provide the quick and optimal response that is necessary to ensure public safety and compliance with regulations.

The above references are incorporated by reference herein where appropriate for appropriate teachings of additional or alternative details, features and/or technical background.

SUMMARY OF THE INVENTION

An object of the present invention is to provide an effluent control system and method that substantially obviates one or more of the above-described problems caused by limitations of the related art.

Another object of the present invention is to provide a real time control system and method for prediction and control of unit operations in an effluent treatment plant.

Yet another object of the present invention is to provide a treatment system and method for controlling all effluent quality parameters for unit operations in a effluent treatment plant.

Still yet another object of the present invention is to provide a water treatment system and method that predicts turbidity in unit operations of a water treatment facility.

A further object of the present invention is to provide a water treatment system and method that controls a dependent parameter based on independent parameters for a water treatment facility.

A further object of the present invention is to provide a water treatment system and method for controlling turbidity based on water quality and chemical dosage parameters.

A further object of the present invention is to provide a nonlinear predictive water control system and method for a selected water quality parameter that does not detrimentally effect remaining water quality parameters.

A further object of the present invention is to provide a control system and method that reduces chemical additions to a process while maintaining treated effluent requirement, in an effluent treatment plant.

A further object of the present invention is to provide a control system and method that constructs virtual sensors for parameters that can not be detected in-line in an industrial treatment plant.

A still further object of the present invention is to provide a water treatment system and method using neural networks, genetic algorithms and deterministic models to control water treatment plants and predict values of parameters within the treatment plant.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 4 is a diagram showing exemplary data recording for a unit operation;

FIG. 5 is a diagram showing exemplary additive control for a unit operation;

DETAILED DESCRIPTION OF PREFERRED EMBODIMENTS

Figure 1:
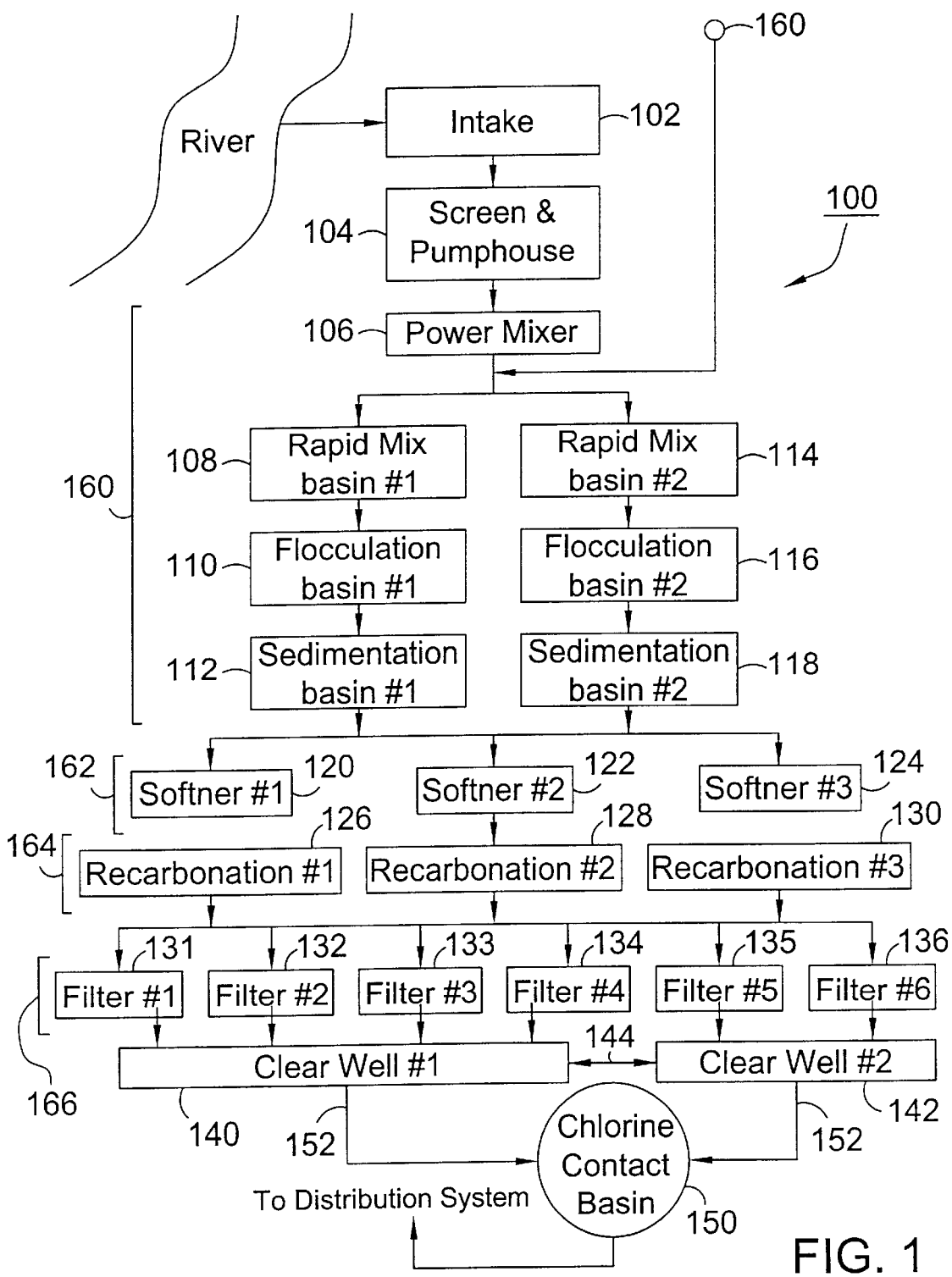
FIG. 1 is a diagram showing a process flow schematic for a water treatment plant.

The University of Iowa Water Treatment Plant (UIWTP) 100 is a surface water treatment plant using Iowa River water with a capacity to add well water during times of high nitrate concentration in the river water. The UIWTP 100 is designed to have a hydraulic capacity of 6,950 gallons per minute (gpm) and a flow of 10.0 million gallons per day (mgd). A schematic diagram of the UIWTP 100 process is shown in FIG. 1.

Operations of the UIWTP 100 will now be described. The UIWTP 100 has an intake unit 102 that is a concrete structure located in the Iowa River. The intake unit 102 has a manually cleaned coarse bar screen and multiple level draw off points. Water is pumped from the top gate during the summer months and from the other gates seasonally. Raw water is conveyed from the intake unit 102 to a screen and pumphouse unit 104 through a 30 inch reinforced concrete pipe.

A screen and pumphouse unit 104 includes fine screening provided by a timer controlled travelling screen. Raw water pumping to the plant is provided by four manual operation vertical, mixed flow pumps in the screen and pumphouse unit 104. Pumping capacities are respectively 2,800 gpm, 2,800 gpm, 1,400 gpm, and 2,100 gpm for the four flow pumps.

The power mixer unit 106 is an in-line mixer with constant speed motor. The purpose is to create a G value of 1000/sec and mix a coagulation chemical (e.g., Ferric sulfate) in the raw water. The power mixer unit 106 is mounted on an 18 inch raw water pipe. Well water 160 can be added to the UIWTP 100 after the power mixer unit 106.

A treatment train of the UIWTP 100 splits into two components after the in-line power mixer unit 106. First and second rapid mix basins 108, 114 are variable speed, axial flow units providing prescribed gravitational forces. The detention time in each of the rapid mix basins 108, 114 is about 1.25 minutes at a flow rate of 3.37 mgd. The drives are manually controlled with an "On-Off" switch located at the motor and at the main control panel, with Variable Frequency Drive (VFD) speed controllers at the motors.

First flocculation basin 116 consists of two parallel trains of wooden paddle units mounted on horizontal shafts in three compartments of increasing size. Second flocculation basin 110 has two parallel trains with four chambers each. Each chamber has a vertical, turbine type flocculator equipped with a manual variable speed drive. Gravitational values are tapered from approximately 80 to 20 through each of the flocculation basins. The drives are manually controlled with an "On-Off" switch located at the motor and at the main control panel. The detention time in each of the flocculation basins 110, 116 is about 49 minutes at a flow rate of 3.37 mgd.

Coagulation-flocculation involves particle destabilization followed by particle growth, and floc formation and break up. The chemistry, kinetics and physico-chemical mechanisms of action of various coagulation reactions are well known.

Selection of the type and dose of coagulants depends on the characteristics of the coagulant, the particles and the water quality. The interdependence between these three elements is understood qualitatively. Consequently, coagulation problems must be solved empirically. The most common technique for determining the dose empirically (e.g., jar testing). Coagulant selection will depend not only on performance, but also on cost and quantity of the coagulant used and the dewatering characteristics of the solids produced. In addition, pH, alkalinity, turbidity, temperature and chemical dose control are measured. Control equation calculations can decide doses for coagulant and pH adjustment based on influent water quality parameters. Generally, straight or stepwise multiple linear regression on plant historical operational data can be used to develop the control equations.

A control loop can be either feedforward, feedback or a combination thereof. In the feedforward scheme, a control system anticipates the effect of measured disturbances on the controlled output and dynamically compensates for them to minimize changes in a desired output. In the feedback control scheme, the measured variable is compared to its desired value to produce an actuating error signal. The error signal is acted upon in such a way as to reduce the magnitude of the error. A combination scheme may involve feedforward control to find an approximate treatment during plant startup, and feedback control to take over once operation normalizes. However, a reagent quantity can be added at a flow proportional rate if the raw water quality is constant. When the water quality changes frequently, either a feedback control or a combination of feedforward-feedback control is used. The effluent water turbidity from the sedimentation basin has to be measured in this case. Further, based on the hydraulic detention time, hours may elapse before the effluent water turbidity change is noted and the feed rate is corrected. In addition, feedback schemes do not guarantee that a desired output will be reached at the lowest reagent cost.

Flocculation occurs in small tanks equipped with systems that slowly stir to avoid breakup of the floc already formed. The UIWTP 100 does not measure chemical flocculants or stir rates for comparison (e.g., a setpoint G value root mean squared velocity gradient)) for optimum coagulation. Flocculant chemicals may be added to aid in floc buildup. Current technology does not allow for optimizing the feed rate of such chemicals.

Sedimentation basins 112, 118 each include settling chambers that are about 59 feet wide, about 85 feet and 2 inches long with about 10 feet of water depth. The detention time in the sedimentation basins 112, 118 is 2.7 hours at a flow rate of 3.37 mgd per basin. The settling basin 118 is a longitudinal, chain and flight type with two cross collectors draining to a central common sump. In the settling basin 112, the sludge is collected by two collector systems. Each system consists of a single drive powering two longitudinal and one cross collection chain and flight system. The weir overflow rate is 20,000 gallons per day at 3.37 mgd per settling tank. Sludge from both the tanks is removed periodically through separate manually operated valves, one for each basin 112, 118.

Operations of a sedimentation basin are difficult to predict. Performance of the sedimentation basin can be predicted using sedimentation theories, however, none of these theories allow for performance prediction in real time with readily measurable parameters. Factors such as temperature, density currents, influent turbidity effects, salinity effects, wind effects, inlet energy dissipation, outlet current, and equipment movement can all hinder the performance of the sedimentation basin. These factors combine to make prediction of the effluent turbidity concentration from a sedimentation basin a difficult task.

Sedimentation basin water quality parameters that are measured typically include inlet turbidity, outlet turbidity, and flow rates. A mid-section turbidity can be monitored to give an early warning of system upsets and to control the coagulant feed. An EPA suggestion is that the outlet turbidity from a sedimentation basin should not exceed 2 NTU at all times to ensure efficient removal of particles and pathogens in the filters.

From the sedimentation basins 112, 118, the UIWTP 100 process flow divides into three softeners 120, 122, 124. The unit dimensions of each of the softeners 120, 122, 124 are approximately 33 feet and 1.5 inches square with 16 feet of water depth. The three softeners 120, 122, 124 are nearly identical units equipped with mixing and reaction zones, a settling zone, a submerged orifice type effluent launder, a variable speed recirculation turbine, and a circular sludge scrapping mechanism. The drives are manually controlled with an "On-Off" switch located at the motor. Sludge is periodically withdrawn through a timer controlled automatic valve. Further, criteria for the softeners 120, 122, 124 include a detection time of 84 minutes, a detention time in a mixing and reaction well of 10.5 minutes, an upflow rate of 1.7 gpm/sf.ft., and an effluent launder loading of 18 gpm/ft, each at a flow rate of 2.25 mgd.

The UIWTP 100 has three recarbonation basins 126, 128, 130. Each of the recarbonation basins 126, 128 and 130 preferably correlate to one softener unit 120, 122, 124. The unit dimensions of each of the recarbonation basins are about 5'-5" wide, 33'-1.5" long with 13 feet water depth. The recarbonation basins 126, 128, 130 baffled with a detention time of 11.2 minutes at a design flow rate of 2.25 mgd.

The UIWTP 100 has six filters 131–136. Filters 131–136 are high rate gravity filter with clay underdrains, fiberglass wash troughs, and a rotary surface washer. Filters 131, 133 are sand media over gravel. Filter 132 is dual media, while filter 134 is an anthracite filter. Filters 135–136 are high rate gravity filters equipped with plastic under drain systems, fiberglass wash troughs, rotary surface washers and dual media. The filters 131–136 have filter boxes 17'7.5" long and 19'2.875" wide. The surface loading rate is 2.3 gpm at 1.12 mgd per filter. Backwash rate is about 19.2 gpm/sq ft maximum.

Two clearwells 140, 142 store the finished water with a total volume of about 118,900 gallons. Clearwell 142 has a capacity of 63,000 gallons and is connected to the clearwell 140 through a 24" valved pipe 144. The clearwells 140, 142 provide chlorine contact volume, transfer pumping volume, and backwash supply volume.

A chlorine contact tank 150 is a one million gallon steel tank. The chlorine contact tank 150 provides a minimum contact time of about one hour for 300,000 gallons. Additional volume can be utilized for ground storage. An outlet is located at the tank center, and the inlet is perpendicular to the tank radius and positioned near the tank perimeter, which provides tangential feed at the tank perimeter and increases the contact time.

The UIWTP 100 includes three transfer pumps 152 rated at 5000 gpm to transfer water from the clear wells 140–142 to the chlorine contact basins 150. Two backwash pumps, each drawing from one clearwell, are rated at 6,500 gpm each. There are also four high service pumps. The high service pumps are automatically controlled by level in the existing elevated storage tank or can be operated manually. From the chlorine contact basin 150, the treated water is transmitted to consumers or the like using a distribution system 160.

Figure 2:
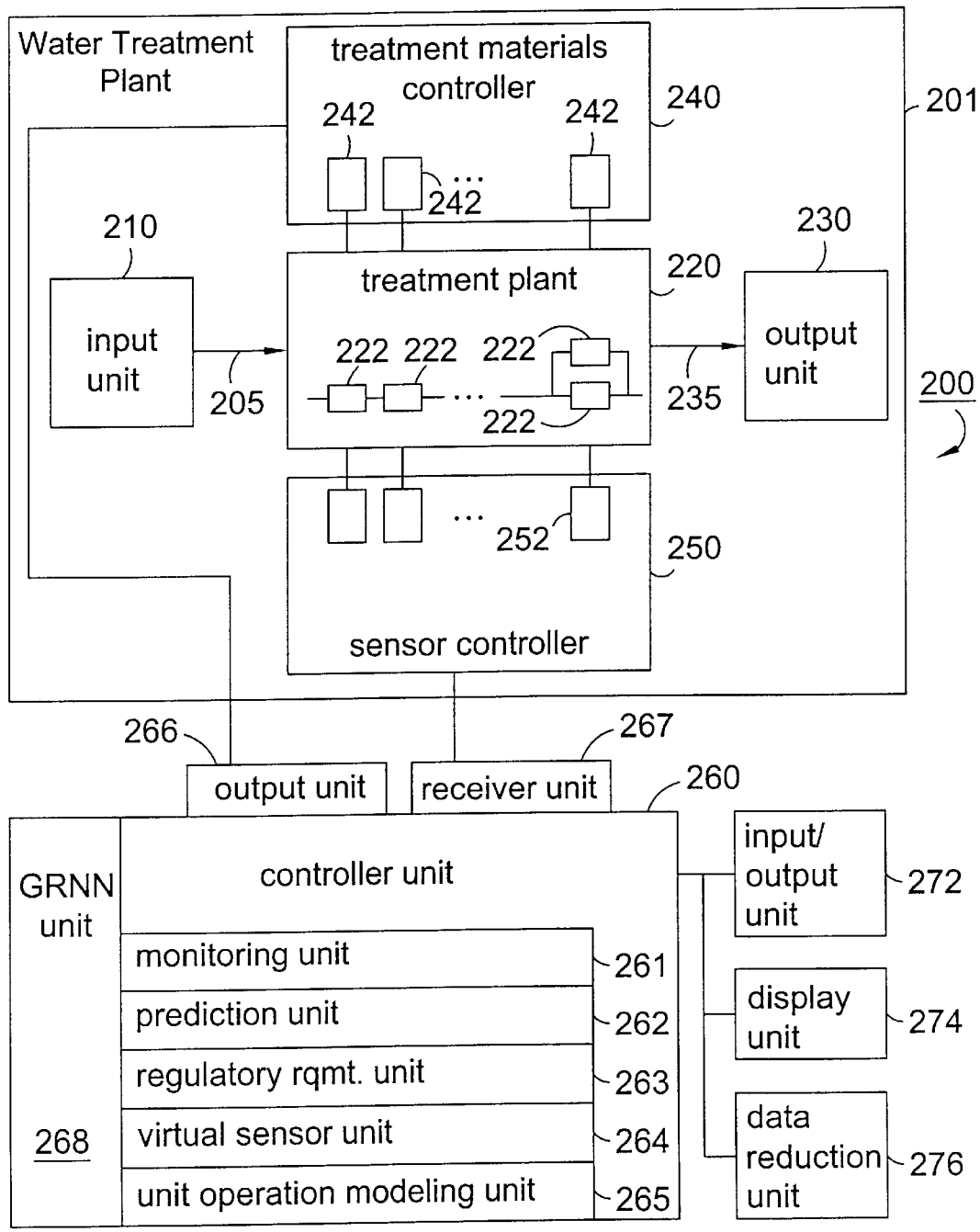
FIG. 2 is a diagram showing a preferred embodiment of an apparatus of a water treatment system according to the present invention.

As shown in FIG. 2, a first preferred embodiment of an apparatus 200 that monitors and controls treatment options and materials to determine turbidity in a treatment plant includes a water treatment plant 201 having an input unit 210, a treatment center 220, an output unit 230, a treatment materials controller unit 240, a sensor controller 250, and a controller unit 260. However, the present invention is not intended to be limited to water treatment plants or limited to the quality characteristic, turbidity. For example, any industrial treatment plant that processes raw input material to output treated material is considered within the scope of the present invention. This application claims benefit of U.S. Provisional Application No. 60/156,591, filed Sep. 29, 1999, and the entire disclosure of the prior application is considered part of the disclosure of the present application and is hereby incorporated by reference. Further, one or more or all quality parameters of the output treated material such as water turbidity or control processes of the industrial plant can be optimized or improved. The input unit 210 receives raw water material or the like to be processed and provides input raw water 205 to the treatment center 220. The treatment center 220 includes a plurality of unit operations 222 that individually process and treat the input raw water 205 within a treatment plant system process of determining and outputting treated water 235 or the like to the output unit 230. The treated water 235 can be supplied to a distribution system (not shown) or the like that delivers the treated water to the various users such as individual consumers. The unit operations 222 can be serially coupled, set in a feedback or feedforward cycles, or coupled in parallel in the treatment center 220. In the apparatus 200, the unit operations 222 can include internal control loops. Further, the unit operations 222 are preferably serially coupled without parallel or feedforward/feedback relationships. Exemplary unit operations 222 include a sedimentation basin, filters or a clearwell or the like.

The sensor controller 250 and the treatment materials controller 240 include a plurality of sensor units 252 and treatments units 242, respectively. The treatment units 242 and the sensor units 252 correspond to at least one unit operation 222 in the treatment center 220. In other words, in treatment units 242 and the sensor units 252 can be coupled to one or more unit operations 222. The treatment units 242 can be used to monitor and/or dispense a desired treatment material used by each unit operation 222 when processing the raw water 205. Further, the treatment units 242 can be used to monitor and/or control a treatment process such as detention time of a unit operation 222.

The sensor units 252 can be used to sense and/or determine water quality and quantity parameters that indicate how individual unit operations 222 are proceeding and/or the treatment center 220 system process is progressing. Further, the sensor 252 can sense treatment center 220 parameters such as power use. Data from the treatment materials units 242 and the sensor units 252 can be respectively collected, stored and displayed by the treatment materials controller 240 and the sensor controller 252 or passed directly to the controller unit 260 through output unit 266 and input unit 267, respectively. For example, the output unit 266 can transmit water quality parameters and the input unit 267 can receive sensor information.

The controller unit 260 can include a monitoring unit 261, a prediction unit 262, a regulatory requirement unit 263, a virtual sensor unit 264, a unit operation modeling unit 265, a GRNN unit 268 and the input/output units 266, 267. The controller unit 260 can further be coupled to external peripherals such as an input/output unit 272, a display unit 274, and a data reduction unit 276. The controller unit 260 is preferably implemented on a programmed general purpose computer or workstation. However, the controller unit 260 can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FGPA or PAL, or the like. In general, any device on which a finite state machine capable of implementing the flowcharts shown in FIGS. 10–16 can be used to implement the controller unit 260.

The display unit 274 is preferably a monitor or the like to display at least a current status of the treatment center 220, the treatment materials controller 240 and the sensor controller 250. The display unit 274 can further display data or prediction results received from the controller unit 260. The data reduction unit 276 can process and store data for the controller unit 260. A printer (not shown)or the like can be coupled to at least the display unit 274. An input/output unit 272 allows the selection, input or review of features including data regarding use or status of treatment materials, sensors, unit operations or plant by plant operators or the like. The input/output unit 272 can be remotely located from the controller unit 260.

In the controller unit 260, the prediction unit 262 preferably determines system effects of changes or proposed changes to delivered doses such as chemicals or changes in other controllable unit operation process variables such as detention time (i.e., speed of the input raw water 205 through the treatment center 220 or an individual unit operation 222). The apparatus 200 effects predicted by the prediction unit 262 can be displayed to an operator via the display unit 274 or the like. The changes within the apparatus 200 can be monitored within the monitoring unit 261. The frequency or interval (e.g., on-change) of recording for the apparatus 200 data can be set by the controller unit 260 using the monitoring unit 261 or at the remote locations of the sensor units 252 or the like.

A process flow diagram can be a start point for the prediction unit 262. A process flow diagram similar to FIG. 3, which represents UIWTP 100 can be used to represent the treatment process of the water plant including the various unit operations 302 and the points of data collection and chemical addition. The process flow diagram preferably begins with a list of unit specific water treatment operations. An exemplary set of operational data with for example, a four hour frequency of measurement for the UIWTP is shown in Table 1.

TABLE 1

| LOCATION | CHEMICAL PARAMETERS | PHYSICAL PARAMETERS |
|---|---|---|
| River Water | pH, turbidity, hardness (total and calcium), alkalinity (P, T) | flow rate, temperature |
| Inline Power Mixer | ferric sulfate | |
| Rapid Mix and Flocculation Basin | ferric sulfate, $KMnO_4$ | flow rate, speed of the turbine |
| Sedimentation Basin Effluent | pH, turbidity, hardness (total and calcium), alkalinity (P, T) | flow rate |
| Upflow Clarifier | pH, turbidity, hardness (total and calcium), alkalinity (P, T), Sludge setting time (5 and 15 minutes), bottom zone time, lime, soda ash, ferric sulfate, sludge solids (once every 24 hours) | flow rate, speed of turbine |
| Recarbonation Basin | pH, chlorine residual | |
| Filter | turbidity, pH, chlorine residual | head loss, rate of flow, hours of operation |
| Chlorine Contact Basin | pH, chlorine residual | |
| Clear Well | pH, turbidity, hardness (total and calcium), alkalinity (P, T), chlorine residual | |

Figure 3:
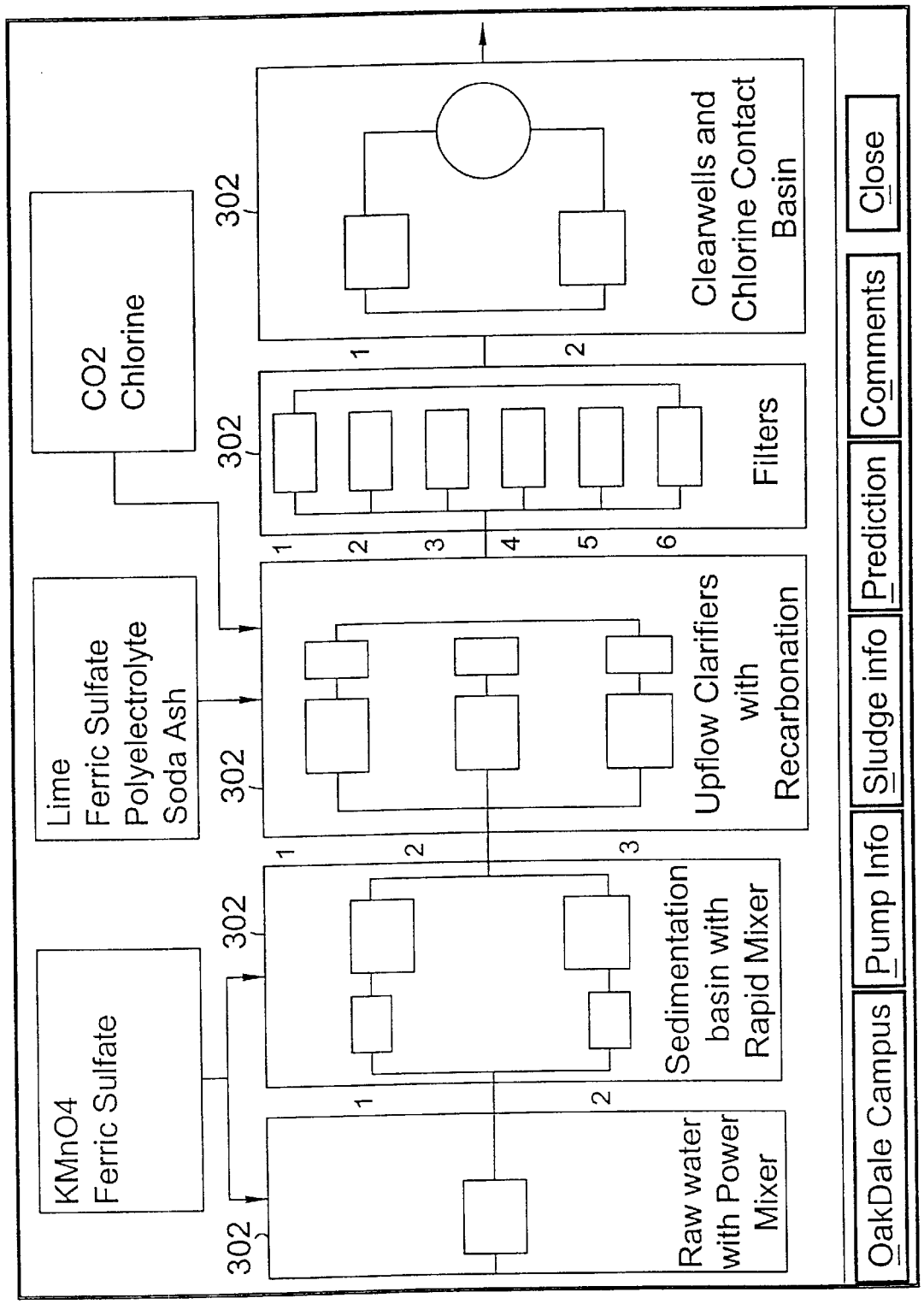
FIG. 3 is a diagram showing an exemplary process flow diagram for treatment plant.
Figure 4:
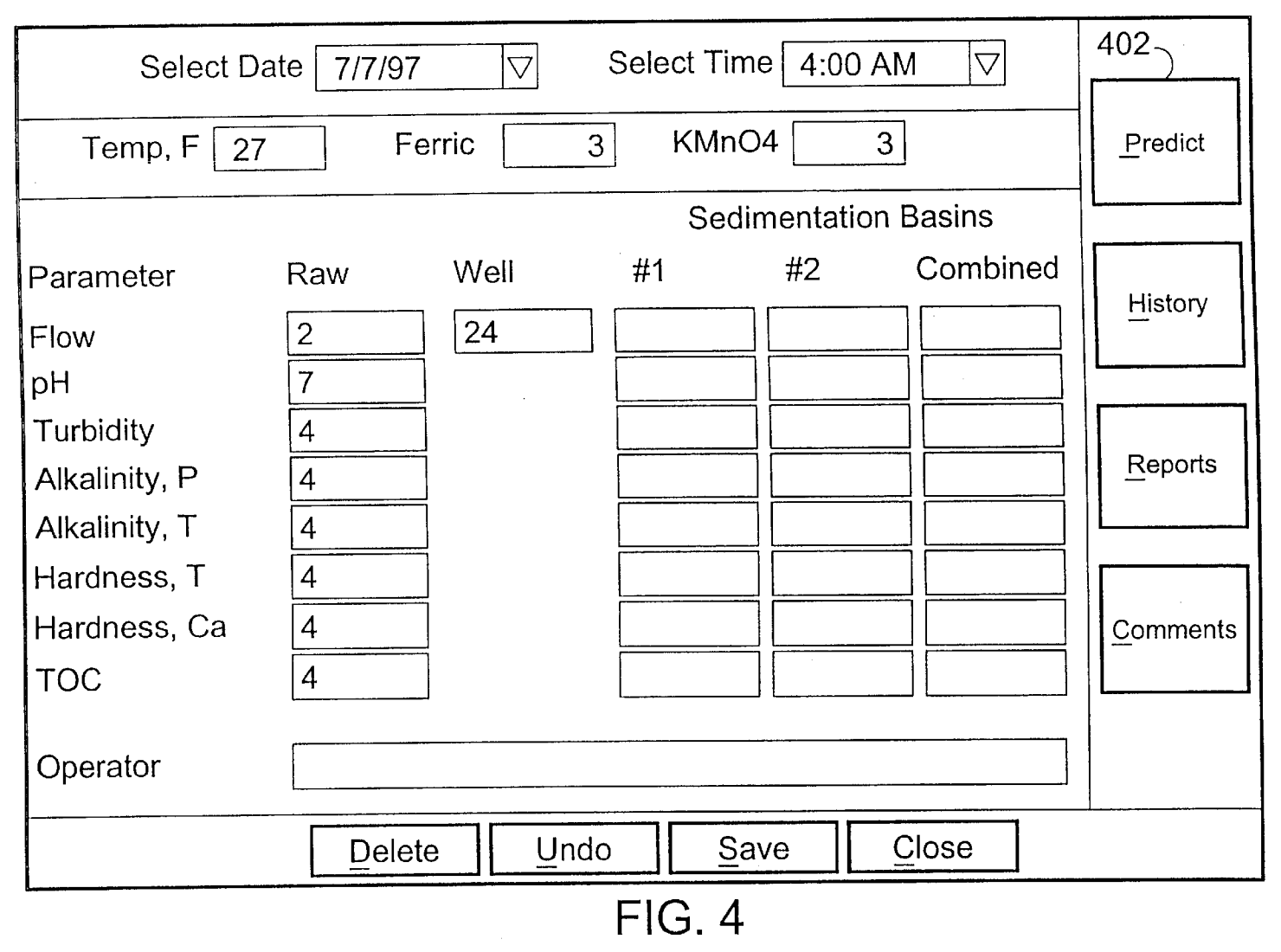
Figure 5:
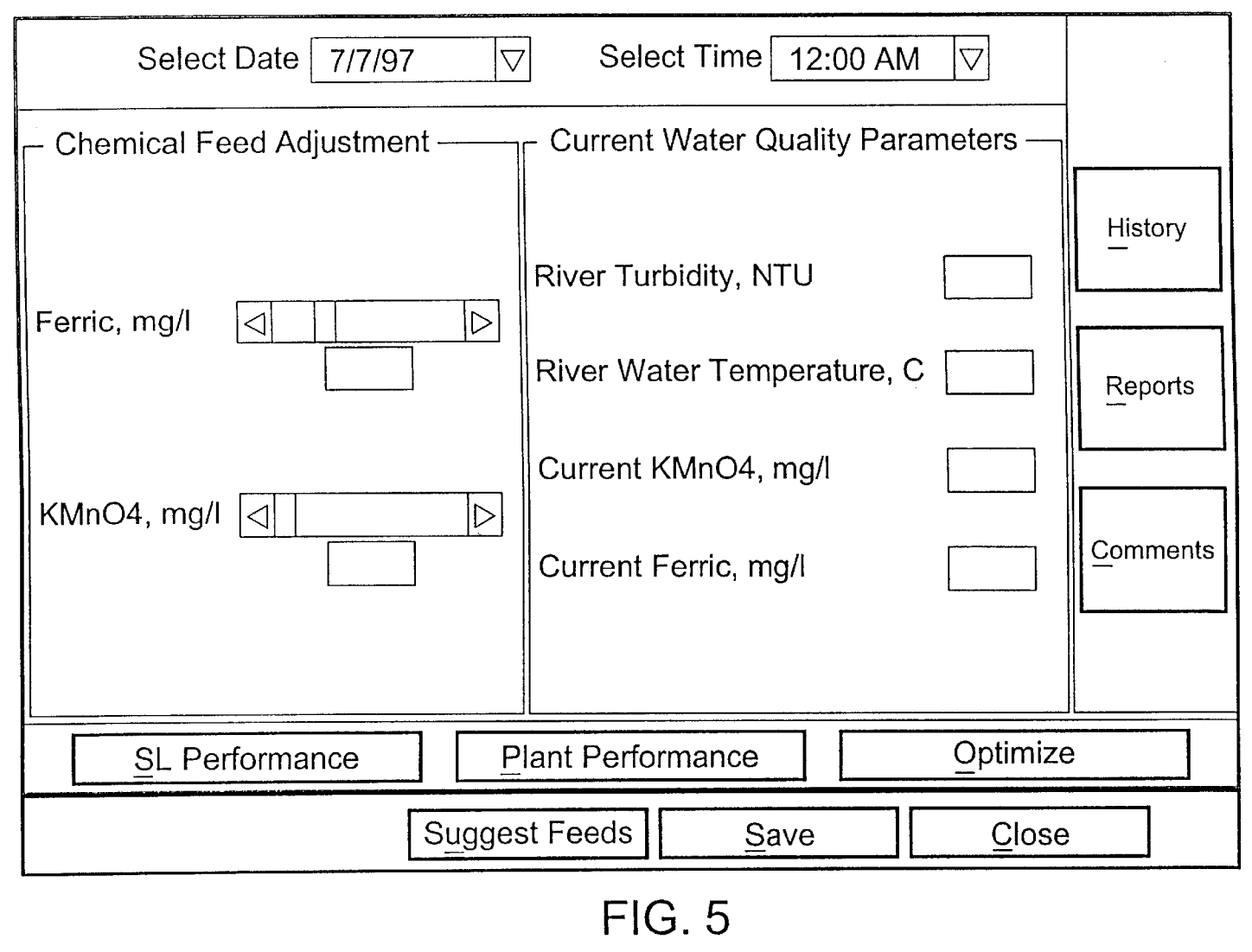

Double clicking on any of the unit operations 302 in FIG. 3 takes the user to an exemplary data section as shown in FIG. 4 of that particular unit operation 302 or chemical feed operation as shown in FIG. 5. FIG. 4 shows a sedimentation basin data recording screen with the raw water parameters listed on the left and FIG. 5 shows a chemical addition screen with water quality parameters and the chemical feed values. The operator can enter and/or adjust data in FIGS. 4–5 using scroll bars or the like, for example.

When the user saves the unit operation's 302 operational data, a predictive model, for the selected water quality parameter such as turbidity, can be performed using a prediction command button 402 for that unit operation 302 by the prediction unit 262. The prediction unit 262 results are compared to the unit's set point for turbidity. An exemplary set of set points for various parameters for efficient plant operation and compliance of various unit operations in the UIWTP is shown in Table 2.

TABLE 2

| PARAMETER | SET POINT |
|---|---|
| Sedimentation basin effluent turbidity | 2 NTU |
| UF1, UF2, UF3 effluent turbidity | 2 NTU |
| Filter effluent turbidity | 0.1 NTU |
| Contact basin free chlorine residual, mg/l | 1.8 mg/l |
| Plant effluent pH | 8.9 |

If the predicted value exceeded the set point then the prediction unit 262 preferably prompts the user to adjust the chemical feeds. The operator could go to the chemical feed information for the unit operation 302 of FIG. 5 that showed the present feed rates for various chemicals for that unit operation 302. The operator can then do a "what if" scenario analysis to determine the right feed rate before adjusting the chemical feeds. Alternatively, the apparatus 200 can directly adjust the chemical feeds based on the predicted value exceeding the set point. Such monitoring can be done, for example, at a user request or periodically.

The regulatory requirement unit 263 can translate regulatory requirements such as maximum contaminant levels of the SWDA into apparatus 200 requirements or intermediate process unit operation input/output requirements. For example, a filter unit operation may have a NTU upper limit for turbidity of 0.1 NTU. The apparatus 200 regulatory requirements can be compared to treatment center 220 data from the monitoring unit 261.

The virtual sensor unit 264 is used to determine data measurements in the treatment center 220 that are not possible to obtain "on-line". The virtual sensor unit 264 performs automatic data verification for parameters. In the virtual sensor unit 264, this feature was performed for the influent parameter section of the unit operations, but is applicable to other sections. Since neural network (NN) models can be unreliable during extrapolation, the virtual sensor unit 264 detects any values that are outside the parameter range used for NN training as shown in Table 3. For values outside such ranges, the operator was prompted that the values were outside the range, and the operator had to enter the value for plant operation.

TABLE 3

| Parameter | Upper Limit | Lower Limit |
|---|---|---|
| Sedimentation basin effluent turbidity | 5 NTU | 0 |
| KMn04, mg/l | 3.0 mg/l | 0 |
| Influent temperature. F. | 86 | 33 |
| Upflow clarifier 2P-T | 100 | 0 |
| Upflow clarifier, SST 5 minutes | 200 | 25 |
| Upflow clarifier, SST 15 minutes | 200 | 25 |
| UF turbidity | 5 | 0 |
| Filter head loss | 8 feet | 0 |
| Filter effluent turbidity (all filters) | 1.0 | 0 |
| Ferric, mg/g | 230 | 0 |

The unit operations modeling unit 265 preferably determines for each of the unit operations 222 in the system process of the treatment center 220 control requirements for manipulated variables (e.g., treatment materials) to output a selected variable (e.g., water quality parameter such as turbidity) of the raw water with desired characteristics (e.g., turbidity <0.1 NTU). Each sub-process or unit operation 222 further inputs state variables and can be controlled for multiple variables when providing the selected variable with the desired characteristics. The unit operation modeling unit 265 and the prediction unit 262 can use the GRNN unit 268 to generate underlying unit operation equations or system estimation. Exemplary unit operations 160, 162, 164 and 166 as shown in FIG. 1 can be unit operations such as the unit operations 222 for the treatment center 220. The first preferred embodiment of an apparatus 200 can be used to control the UIWTP 100 or the like. In the apparatus 200, data for treatment materials and sensed parameters are obtained to model each unit operation. Each succeeding unit operation can be coupled with models of preceding unit operations to develop a treatment plant or system process model. A model for a unit operation can include a plurality of the unit operations 222.

Figure 6:
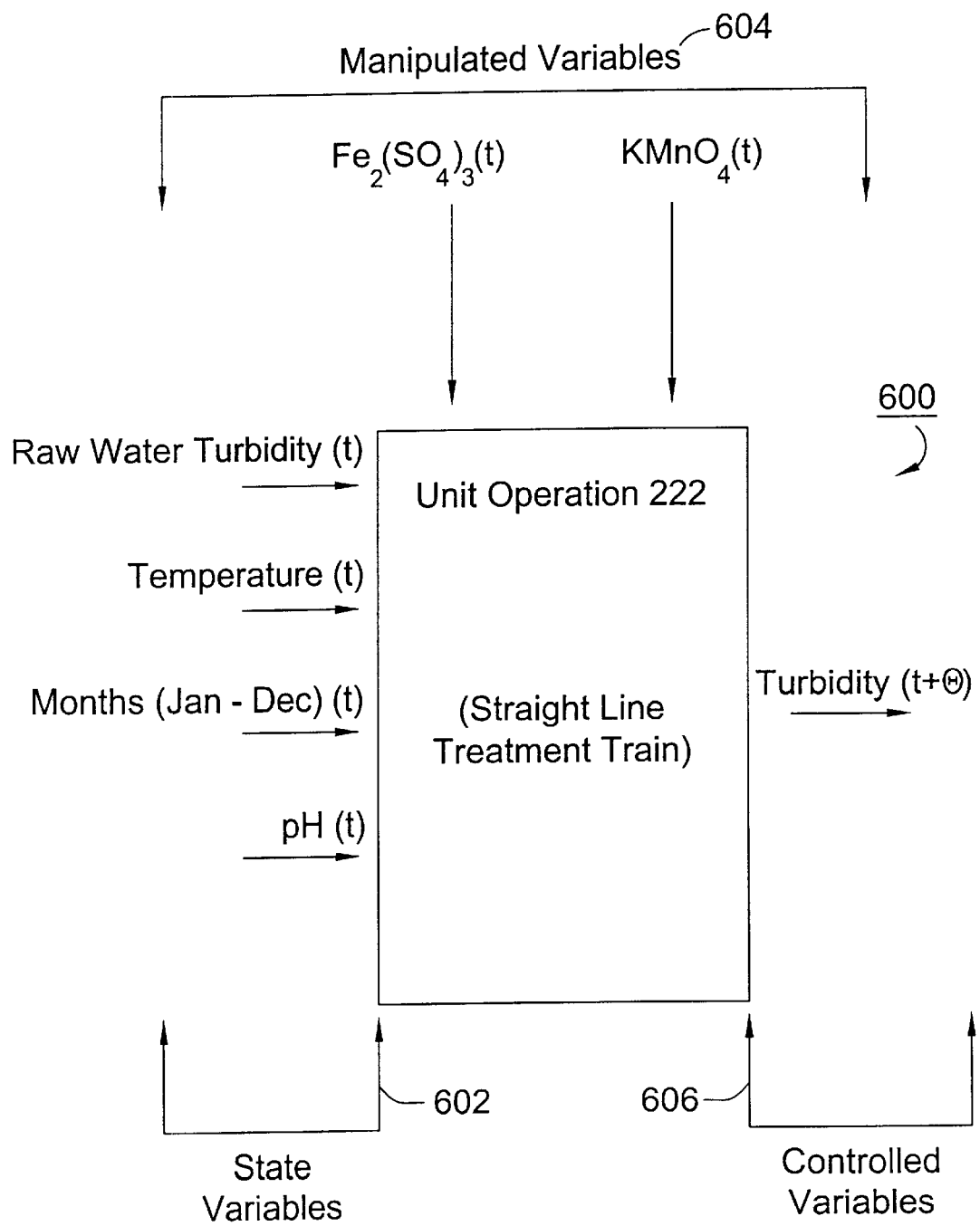
FIG. 6 is a diagram showing an exemplary state diagram for a unit operation.

FIG. 6 shows an exemplary state diagram for a unit operation 222 of the unit operations modeling unit 265. As shown in FIG. 6, the unit operation is a straight-line unit operation and the water quality parameter is turbidity. In the UIWTP 100, a straight-line treatment train includes an inline power mixer, two rapid mix basins, two flocculation basins and two sedimentation basins. The unit operation state diagram 600 includes state variables 602, manipulated variables 604 and controlled variables 606. In FIG. 6, (t) depicts a time dependent variable and Θ depicts a detention time of the input raw water 205 being treated in the unit operation 222.

The unit operations modeling unit 265 can be used to model the unit operations of the UIWTP 100, for example. A list of exemplary unit operations of the UIWTP 100 and the predicted parameters that can be modeled according to the unit operations modeling unit 265 is given in Table 4. The models were grouped by the unit operations: Straight-line (SL), Upflow Clarifier (UF), Recarbonation and Filters. However, the preferred embodiments of the present invention is not intended to be limited to this. For example, the unit operations could be combined. Alternatively, unit operations such as the straight line unit operation, for example, could be subdivided for increased granularity.

TABLE 4

| MODEL NAME | PREDICTED PARAMETER |
| --- | --- |
| SL turbidity model | SL Effluent turbidity NTU |
| SL alkalinity model | SL Effluent alkalinity (P, total) |
| SL pH model | SL Effluent pH |
| SL Ferric model | SL Coagulant dose mg/L |
| SL Potash model | SL KMnO4 dose |
| UF1 turbidity model | UF1 Effluent turbidity, NTU |
| UF2 turbidity model | UF2 Effluent turbidity, NTU |
| UF3 turbidity model | UF3 Effluent turbidity, NTU |
| UF1 pH model | UF1 Effluent pH, NTU |
| UF2 pH model | UF2 Effluent pH, NTU |
| UF3 pH model | UF3 Effluent pH, NTU |
| UF1 alkalinity model | UF1 Effluent alkalinity (P, total) mg/L as $CaCO_3$ |
| UF2 alkalinity model | UF2 Effluent alkalinity (P, total) |
| UF3 alkalinity model | UF3 Effluent alkalinity (P, total) |
| UF1 hardness model | UF1 Effluent hardness (total and Ca) |
| UF2 hardness model | UF2 Effluent hardness (total and Ca) |
| UF3 hardness model | UF3 Effluent hardness (total and Ca) |
| Filter 1 turbidity | Filter effluent turbidity, NTU |
| Filter 2 turbidity | Filter effluent turbidity, NTU |
| Filter 3 turbidity | Filter effluent turbidity, NTU |
| Filter 4 turbidity | Filter effluent turbidity, NTU |
| Filter 5 turbidity | Filter effluent turbidity, NTU |
| Filter 6 turbidity | Filter effluent turbidity, NTU |

A system model for The University of Iowa Water Treatment Plant can include many parameters for each unit operation. The apparatus 200 can be used to control the UIWTP 100 with four unit operations 222 where each of the succeeding unit operations were connected with the models of the preceding unit operation to develop a system.

Various statistical and deterministic models have been used to control water treatment plants. However, Applicants determined that Neural Networks (NN) can perform better. Neural Networks (NN) are mathematical models that emulate behavior. Neural networks can recognize, classify, convert and learn patterns. A pattern is a qualitative or quantitative description of an object, concept or event. Neural networks derive their intelligence (generalization instead of curve fitting) from the collective behavior of simple computational mechanisms at individual neurons. Many neural based architectures are available to instantiate the unit operations modeling unit 265. Applicants rigorously evaluated neural networks and obtained unexpected results with one particular neural network, a General Regression Neural Network (GRNN). Further, many training and stopping criteria, scaling functions, activation functions, and learning rate methods are available within the selected neural networks. Applicants rigorously and repeatedly modeled, tested and evaluated various combinations to determine the preferred embodiment of the selected neural network (best model). The modification based on genetics modeling with the GRNN provided unsurpassed estimations of the process control and prediction for the preferred embodiments when applied to the UIWTP 100. In addition, Applicants developed and evaluated statistical and deterministic systems to provide a baseline comparison, where possible, for the preferred embodiments of the NNs according to the present invention.

Figure 7:
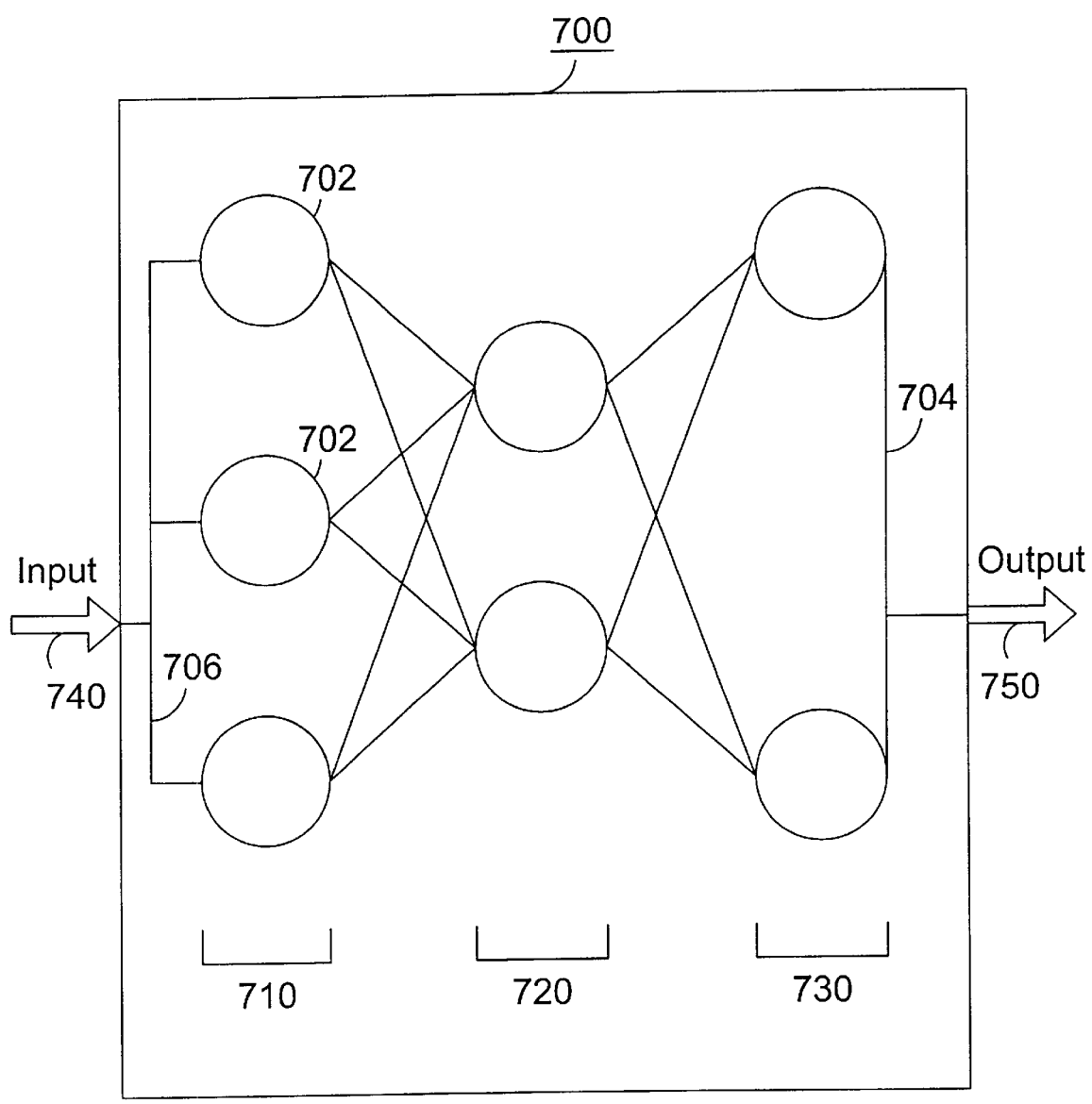
FIG. 7 is a diagram showing a neural network system.

As shown in FIG. 7, a NN 700 is represented by a set of nodes 702 and arrows 704. A node 702 represents a neuron, and an arrow 704 corresponds to a connection along with the direction of signal flow between neurons. The NN 700 structure has an input layer 710, a hidden layer 720 and an output layer 730. The input layer 710 contains nodes that encode the instance presented to the network for processing. The hidden layer 720 provides non-linearities for the NN 700. The output layer 730 encodes possible concepts to be assigned to the instance under consideration. A NN can act as an preprocessor, postprocessor, as a mathematical model or as a baseline control. A NN acts as a system model by example mapping. If accuracy is the only concern for a model, then the NN may be suited for that application. A NN can have supervised learning or unsupervised learning. The supervised learning algorithm assumes the availability of a supervisor who classifies the training examples into classes. Unsupervised NNs heuristically process unlabeled instances. Examples of supervised learning algorithms are back propagation networks, Radial Basins Function Networks and the General Regression Neural Network. An example of an unsupervised learning algorithm is the Adaptive Resonance Theory Network.

As shown in FIG. 7 for the NN 700, each input is given a weight which represents its synaptic priority or strength. The sum total of all input can be expressed in vector form as the dot product of $X = \{X_1 X_2 \ldots X_n\}$ and $W = \{W_1, W_2 \ldots W_n\}$, which is $X_i = X \cdot W$. A node 702 input signal 706 is processed by an activation function to produce an output signal 704, which, if it is not zero, is transmitted along the NN 700. Activation levels of the nodes 702 are dependent on the activation function chosen to implement the NN 700. Hidden nodes 702 in the hidden layer 720 relay data from the input layer 710 to the output layer 730 only if an input signal strength is sufficient to cause activation. The output layer 730 then encodes possible concepts to be assigned to the instance under consideration. After an output vector has been generated by a NN, it is compared with the original input and the error calculated.

Figure 9:
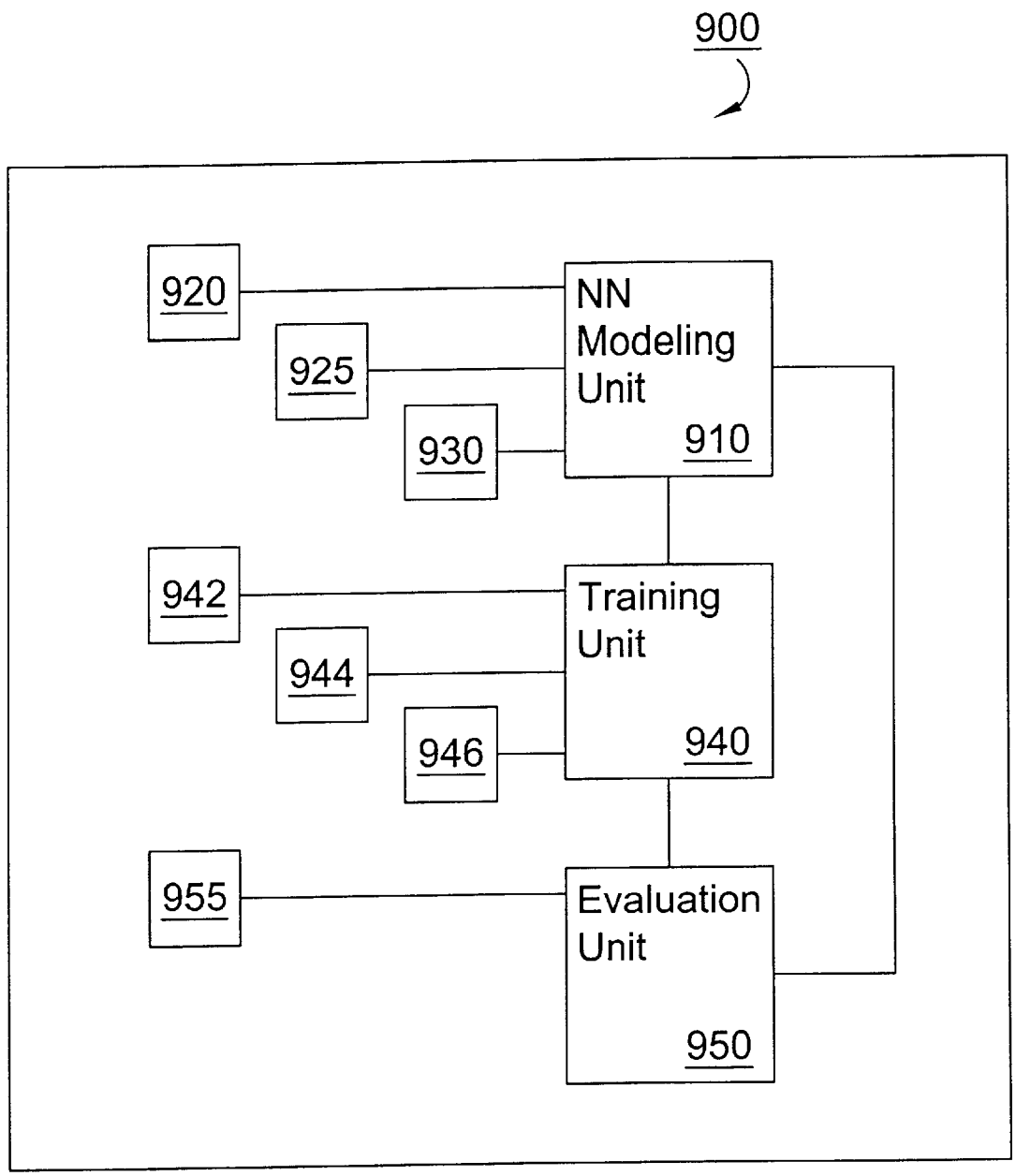
FIG. 9 is a diagram showing a preferred embodiment of a unit operation evaluation device according to the present invention.

FIG. 9 shows a second preferred embodiment of an unit operation evaluation system 900 according to the present invention. The unit operation evaluation system 900 can be used, for example, in the unit operations modeling unit 265. The unit operation evaluation system 900 includes a neural network modeling unit 910, an activation function modeling unit 920, a hidden layer modeling function 925, a scaling function modeling unit 930, a training function unit 940 and an evaluation function 950. The evaluation function 950 preferably includes a genetic modeling function 955.

The activation function modeling unit 920 included various generated activation functions, which are nonlinear functions applied to the net input of the neuron and to determine the output of that neuron. The range of the activation functions (values it can output) is generally limited. However, the levels can be discrete (e.g., 0 and 1), continuous across a range or unrestricted. A hard limiting function produces a discrete output, while the sigmoid function can be expressed as equation 1 as follows:

$$F(x) = \frac{1}{1 + e^{-x}} \quad (1)$$

produces an output continuous across the range of reals between 1 and 0. In the above function, $x = \Sigma_{(i)} W_{ji} X_i - \theta_j$, where $W_{ji}$ is the weight on the connection from unit i to j and $\theta_j$ is the threshold of activation on unit j. Activation functions modeled included: linear, sigmoid functions, 10-H, 10-H15, gaussian, hyperbolic tangents, and combination functions by layer. The sigmoid function can be defined as a continuous, real-valued function whose domain is real, whose derivative is always positive and whose range is bounded. The hyperbolic tangent was used because its range (−1 to 1) is twice that of the logistic function.

The hidden layer modeling function 925 initially estimated the number of neurons as follows: # of hidden neurons =½(inputs+outputs)+square root(# of patterns). For example, in a sedimentation basin effluent turbidity model, with 17 inputs, one output, and 3181 patterns, the hidden layer modeling function 925 estimates 66 neurons in the hidden layer. In addition, scenarios using two and five times the number of hidden neurons were also used. This added analysis was performed to see if adding hidden neurons provided better generalization on water treatment plant operational data. Self-pruning networks, which can discard some of the hidden neurons based on criteria like the size of the weights connecting to the output layers to trim the number of neurons, were not modeled.

The scaling function modeling unit 930 used the logistic and tanh functions to scale data. In addition, minimum and maximums were set for the networks. For example, the minimum and maximum values could be selected by the lowest and the highest values detected in the historical data set from the UIWTP 100, or the lower and upper limits could be set to 0 and 1, respectively.

The training function unit 940 includes a pattern selection unit 942, a weight determining unit 944 and an error determining unit 946. For NN analysis, the problem data set needed to be separated into training, test and validation (verification) data sets. Training data set was the data set that was used to train the NN. Test data set was the data set which was used for testing the NN performance and for cross validation, which prevented over training of the networks so that new data is accurately generalized. The validation set was used to test the network's results with data the network had never "seen" before.

The pattern selection unit 942 can use, for example, rotation and random methods for pattern selection. Rotation methods selects the patterns by appearance in the training file. Random methods chooses the patterns randomly, although without guarantee that every pattern will be chosen a equal number of times. The pattern selection unit 942 used a random method because the UIWTP 100 water plant operational data is not a time series data.

The weight determining unit 944 evaluated various types of weight update methodologies available including: vanilla, momentum and turboprop. The vanilla method of weight update means that a learning rate is applied to the weight updates but a momentum method is not used. In the momentum weight update method, the weight updates not only include the change dictated by the learning rate but also a portion of the last weight change as well (the momentum term). The momentum weight update method is useful due to noise in the data as the high momentum term dampens the weight fluctuations.

The error determining unit 946 evaluated various error measurements. Mean Squared Error is the mean overall pattern in the (i.e., the mean of (actual−predicted)). Mean Absolute Error is the mean overall pattern of the absolute value of the actual minus predicted (i.e., the mean of (actual−predicted)). Max Absolute Error is the maximum of (actual−predicted) of all patterns. Correlation Coefficient r (Linear Correlation Coefficient) is a statistical measure of the strength of the relationship between the actual vs. predicted outputs.

The training unit 940 further provided iterative neural network training. NN training preferably proceeds to a point where it generalizes very well on the training set, but not on the test data set. This has been avoided in the training unit 940 by the following method. The training was done on the training set and then at regular intervals (every 500 patterns), the test set was read and an average error computed for it. When the error in the test set starts increasing but the error in the training set gets smaller, the network is saved. Training in the training unit 940 was then continued past this point for additional 100,000 patterns or events. If the minimum error in the test set did not change then the network saved was saved and the network training stopped.

In the NN modeling unit 910, various NNs were modeled including: three-layer backpropagation NNs, four-layer backpropagation NNs, five-layer backpropagation NNs, special-type (e.g., Ward) NNs, recursive and general regression NNs (GRNNs).

Figure 8:
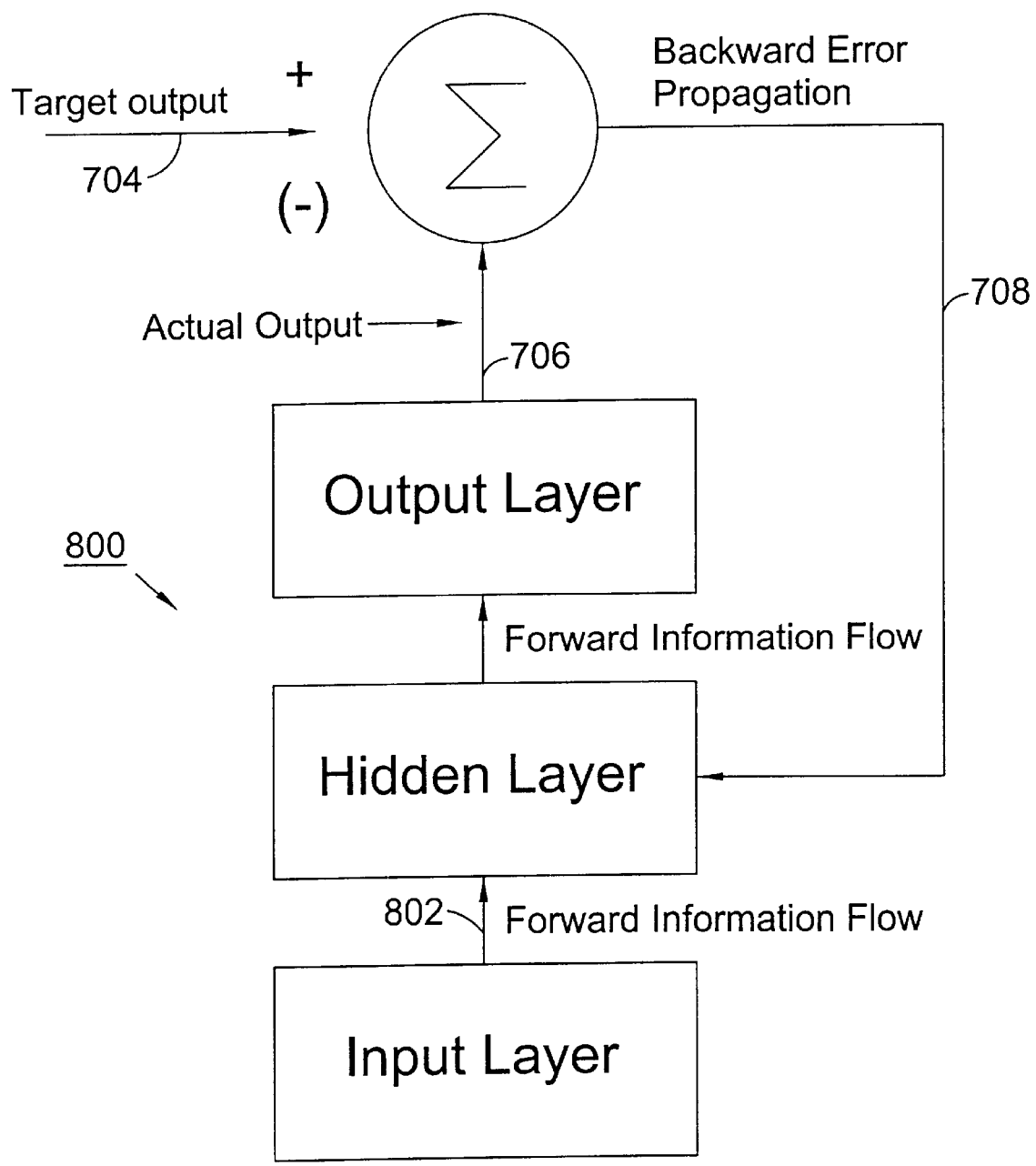
FIG. 8 is a diagram showing an exemplary back propagation neural network.

As shown in FIG. 8, an exemplary NN is a back propagation NN 800. A back propagation network involves presenting training sets of input vectors 802 and target output vectors 804 that are representative of a process being approximated. The back propagation NN 800 produces an actual output 806 in response to an input vector 802 presentation. The two vectors, actual output 806 and target output 804, are compared. If there is no difference, no learning takes place. However, if there is a difference, the weights of the back propagation NN 800 are changed to reduce the difference. As the NN system 800 is trained with different examples, the NN system 800 has the ability to generalize over similar features found in different patterns. The precision of the backpropagation NN can be improved by creating a network for each output (unless they are categories). A standard connection is the one in which each layer is connected to the immediately previous layer. Three, four, five or more layers are possible.

A special type of backpropagation NN included networks using different activation functions that can detect different features in a pattern processed through a network (e.g., modified Ward NNs). For example, a design may use one type of activation function (Gaussian) to detect the features in the mid range of the data and use another function like gaussian complement to detect the features in the upper and lower regions of the data for the UIWTP 100.

GRNN works by measuring how far a given sample pattern is from patterns in the training set in N dimensional space, where N is the number of inputs in the problem. When a new pattern is presented to the network, that input is compared in N dimensional space to all the patterns in the training set to determine how far in distance it is from those patterns. The output that is predicted by the network is a proportional amount of all of the outputs in the training set. The proportion is based upon how far the pattern is from the given patterns in the training set. If a new pattern is in the cluster with other patterns in the training set, the outputs for the new pattern are going to be very close to the other patterns in the cluster around it. The distance can be measured as an Euclidean distance or City block distance. The Euclidean distance is expressed by the equation: $Z_i = \Sigma_{j=1-p} (xj-xj^1)^2$. The City block distance metric is the sum of the absolute values of the differences in all dimensions between the pattern and the weight vector for that neuron.

Iterative type as well as the genetic modification of the iterative type were used to vary the GRNN in the unit operation evaluation system 900. Within the iterative type, both logistic and tanh activation functions were used.

Genetic algorithms (GA) seek to solve the optimization problem using the method of evolution, especially survival of the fittest to leave behind a fit population (the correct solution set). Applicants used genetic based estimations to modify the unit operation predictions in the unit operation evaluation system 900. For example, genetic based estimations were used to see how system models for the UIWTP could be optimized to yield the setpoint turbidity value for the effluent water.

Input vectors are thought of as chromosomes, and each is given a fitness level which determines the "reproductive" ability of that chromosome. Chromosomes exhibiting greater fitness are favored for reproduction, but each member of the community has a chance for selection. If m(H,t) is the number of chromosomes of configuration H at time t, then the number at time (t+1) is approximated by m(H,t+1)=(m(H,t))f(H)/fbar, where f(H) is the fitness of H and fbar represents the average fitness of the entire population. Starting at t=0 and maintaining static fitness value, we obtain m(H,t+1)=m(H,0)(f(H)/fbar)$^t$, which shows that the number of favorable chromosomal configurations will increase exponentially over time. The inverse is true for unfavorable configurations; they will decrease exponentially over time. In accordance with genetic modeling, parents are selected and "mated". Genetic operators are applied to each input vector, creating a unique offspring that exhibits the characteristics of the parent vectors. The process is as follows:
1. Initialize the chromosome population; and
2. If the termination criterion are meant (the population is optimally fit), exit, else repeat the following steps:
   a) Choose one or more parent chromosomes, favoring higher fitness. Apply genetic operators to the parents to produce children.
   b) Evaluate the children and select favorable ones for survival. Survivors are inserted into the population. The whole population may be replaced, or only a subset.

Evaluations by the various parameters in specific unit operations or combinations were preferably rated based on error characteristics in the unit operation evaluation system 900.

As described above, several neural network architectures, training and stopping criteria, scaling functions, activation functions, and learning rate methods were used. Various combinations of these variables were used to select a model preferably based on mean squared error and $R^2$.

Figure 10:
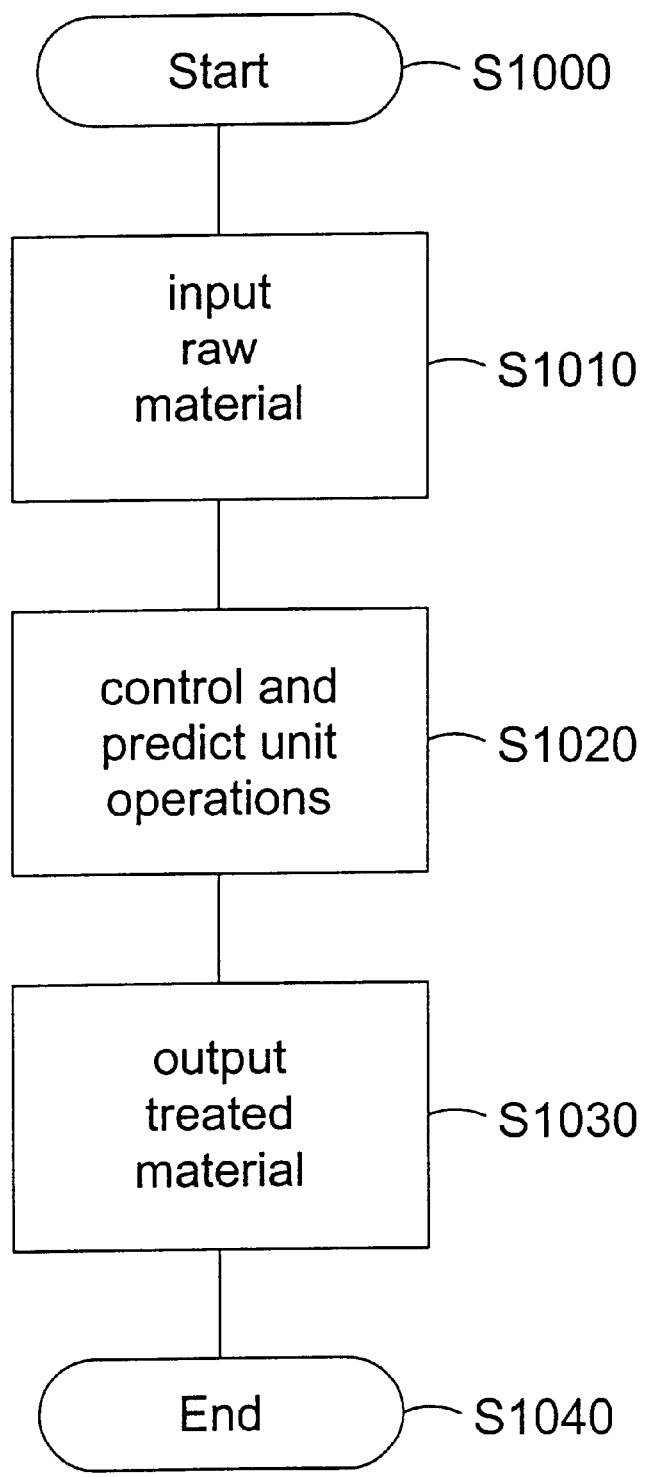
FIG. 10 is a diagram showing a preferred embodiment of a method for controlling water treatment according to the present invention.

A third preferred embodiment of a method for controlling the UIWTP 100 according to the present invention will now be described. As shown in FIG. 10, a process begins in step S1000 where control continues to step S1010. In step S1010, an input raw material is provided. From step S1010, control continues to step S1020. In step S1020, unit operations are controlled and predicted. For example, a filter unit operation could be controlled and predicted results determined based on input parameters. Exemplary state and manipulated variables to determine a control variable, turbidity in a Straight Line Treatment Train are shown in FIG. 6. From step S1020, control continues to step S1030. In step S1030, the treated material is output. From step S1030, control continues to step S1040 where the process ends.

Figure 11:
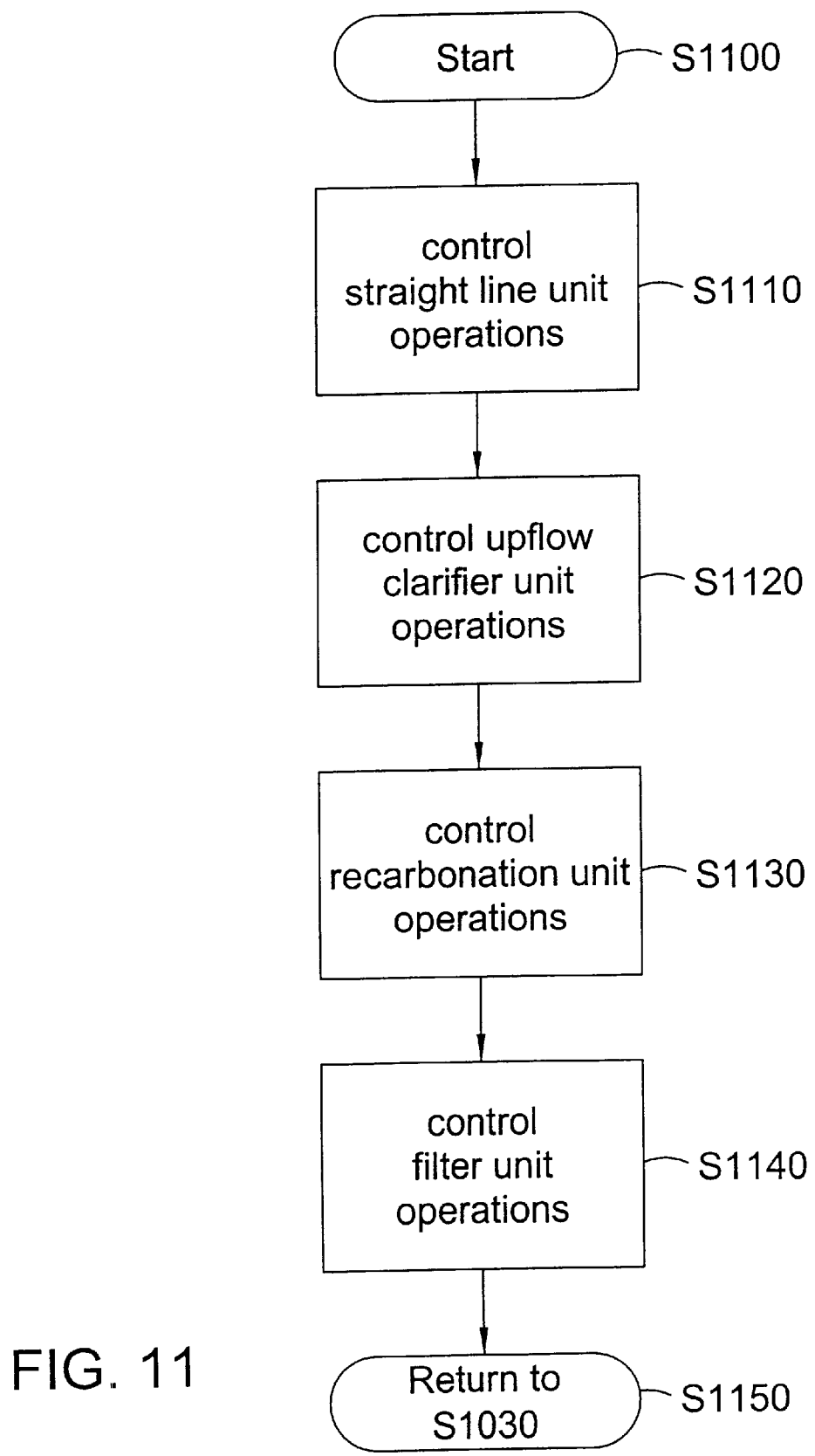
FIG. 11 is a flowchart showing an exemplary system process of unit operations for water treatment.

An exemplary method for the controlling and predicting unit operations according to the third preferred embodiment will described with respect to FIG. 11. According to the method, initial training with historical operational data develops equations that can in turn predict the present and future performance of a plant in real time. The method can also optimize the performance of the plant to meet predetermined subpoints of various parameters. This can be used among other ways to enable the plant to meet all regulatory needs with optimum performance. The method includes forming a non-linear predictive model for turbidity. The method considers the influent water quality and analyzes treatment options available to predict the dose of various chemicals required to get optimum treatment. It will then predict plant performance in real time. The method accounts for treatment differences due to seasonal variations in temperature, type of turbidity, and alkalinity. This is important because the temperature of the water affects the rate of chemical reaction as well as the physical properties of water like viscosity and surface tension.

In one instance, a unit operation being a softener is modeled separately in a softener control loop. The method optimizes the feed of lime, ferric sulfate, and soda ash to achieve turbidity within an acceptable amount in the effluent water from the softeners. Turbidities in ferric sulfate dose is modeled using neural networks. Lime and soda ash dose is determined using a genetic algorithm or a chemical mass balance. Each filter is modeled using a filter control loop which optimizes plant operation such that terminal filter headlock and filter turbidity occur as close to each other as possible while maximizing the length of filter runs and filtration efficiency. The method for a filter model controls the total system model including the above-discussed models.

Figure 12:
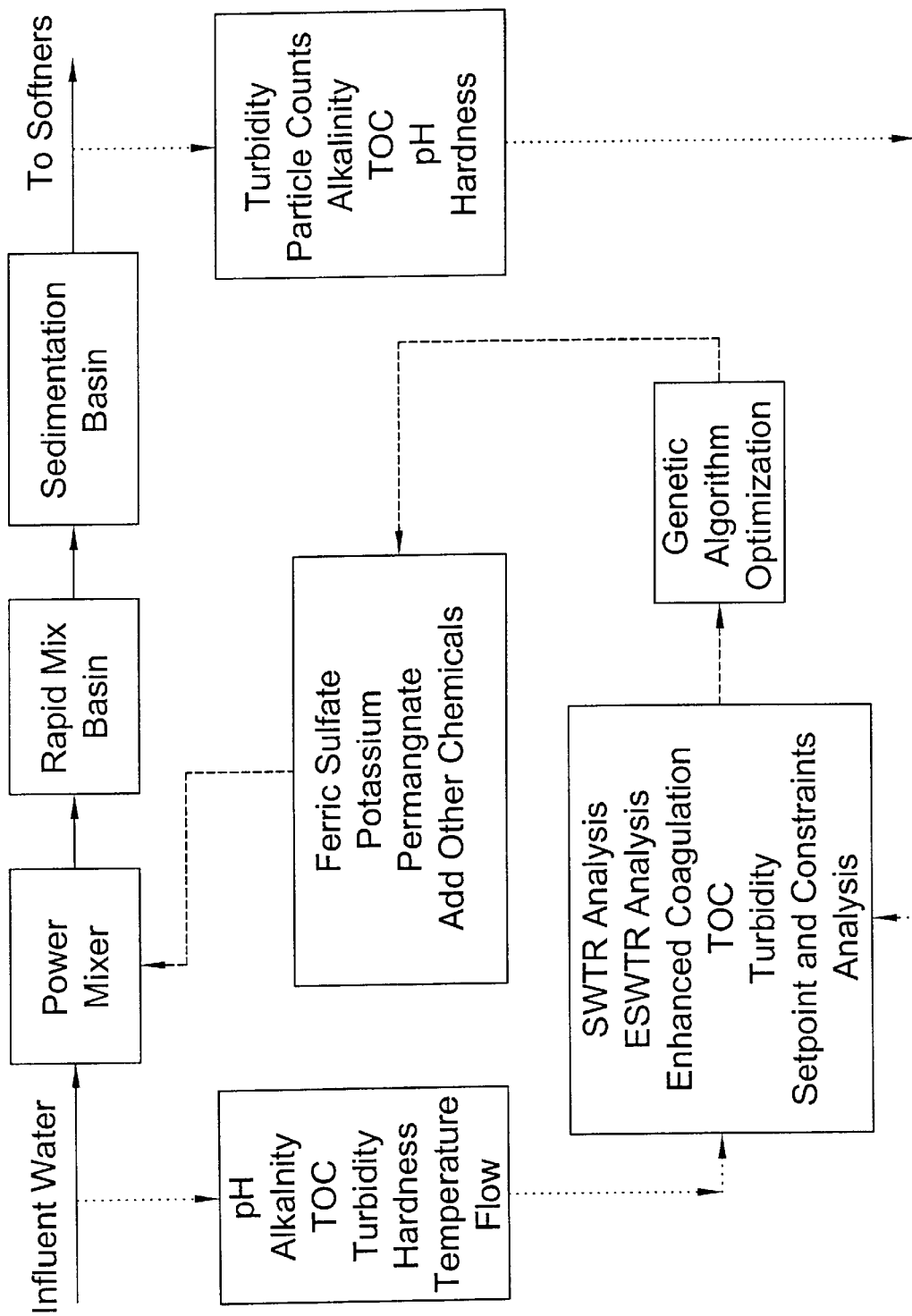
FIGS. 12–14 are flowcharts of a flow state diagram of an exemplary unit operations.

As shown in FIG. 11, an exemplary process for unit operation control in step S1020 begins in step S1100 where control continues to step S1110. In step S1110, a straight-line unit operation is controlled. For example, the straight-line unit operation in the UIWTP 100 can include a straight-line treatment train having one in-line power mixer unit 106, two rapid mix basins 108, 114, two flocculation basins 110, 116 and two sedimentation basins 112, 118. Thus, in the straight-line unit operation step, a power mixer, rapid mix basin, flocculation basin and settling tank are treated as one system. In the straight-line unit operation control step S1110, the effluent turbidity concentration is predicted. the actual effluent turbidity concentration can be confirmed by a sensor such as a turbidimeter. The intermediate parameter or the goal of the straight-line unit operation is to maintain the effluent turbidity below 2 NTU. An exemplary straight-line operation control loop is shown in FIG. 12. From step S1110, control continues to step S1120.

Figure 13:
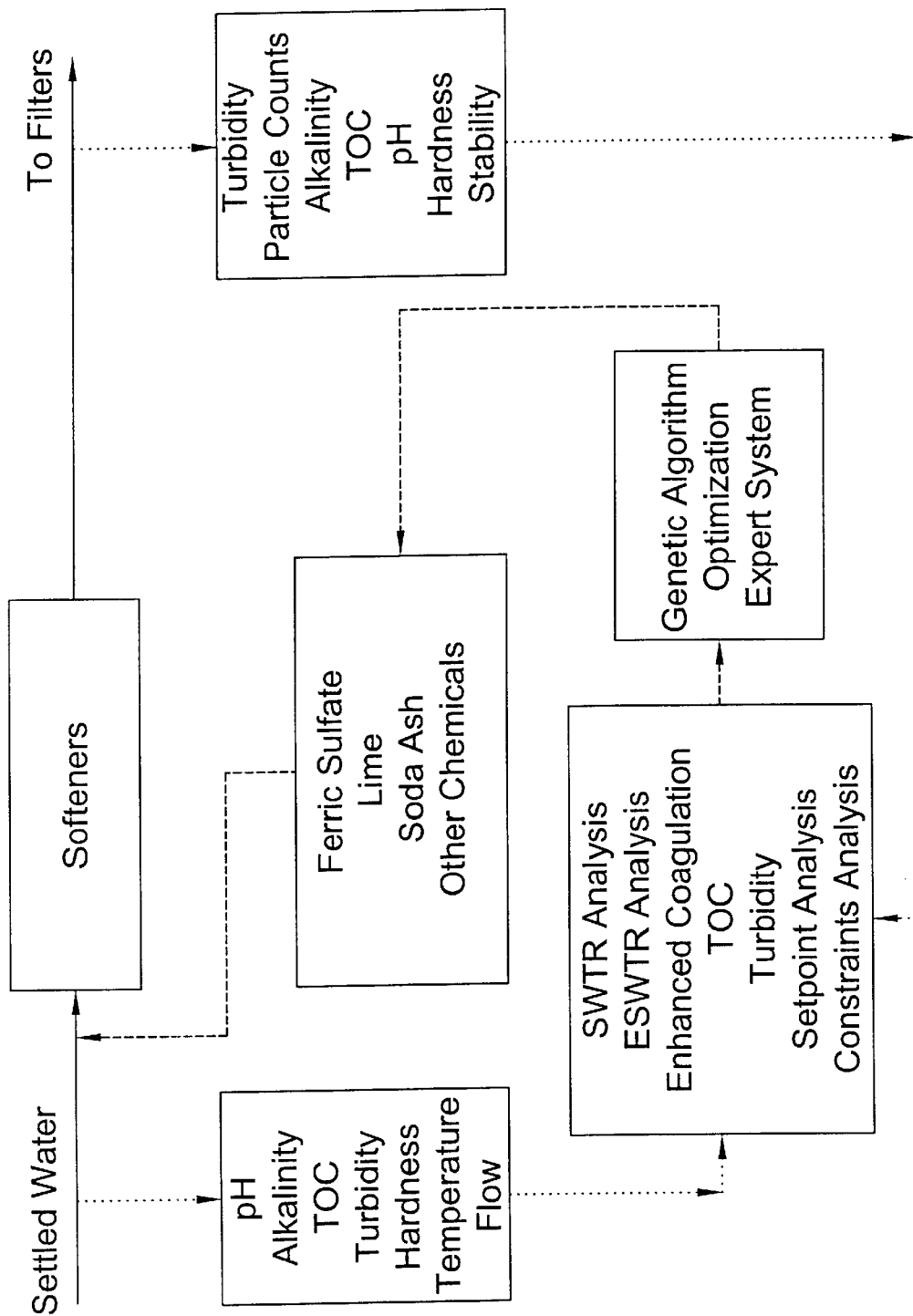

In step S1120, the upflow carrier or softener unit operation is controlled. In the third preferred embodiment, each softener is modeled and controlled separately. Thus, in step S330, each of the softeners 120, 122, 124, of the UIWTP 100 were individually controlled. The upflow clarifier unit operation optimized the feed of lime, ferric sulfate and soda ash to achieve turbidities at an intermediate parameter level of less than 2 NTU in the effluent water from the softeners. For example, turbidities and ferric sulfate dose can be modeled using neural networks described in the apparatus 200. Lime and soda ash required were determined using a chemical mass balance or a genetic algorithms. Control flow for a softener control unit is shown in FIG. 13. From step S1120, control continues to step S1130.

Figure 14:
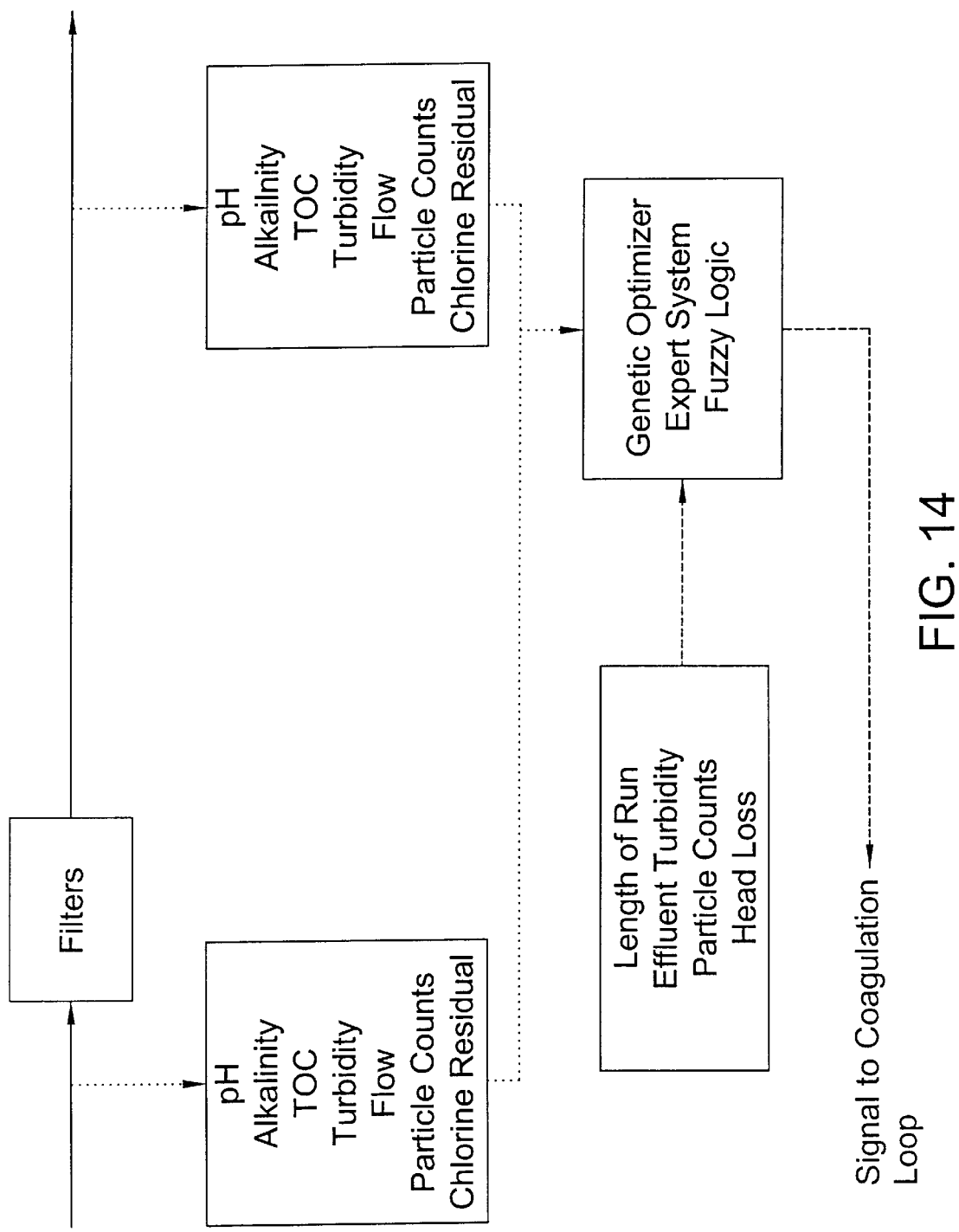

In step S1130, each of the recarbonation units 126, 128 and 130, were controlled. From step S1130, control continues to step S1140. In step S1140, the filter unit operation was controlled. Each filter of the UIWTP 100 was separately modeled and controlled in the filter unit operation. Thus, each of the filters 131–136 have a separate model control loop. An exemplary filter operation control loop is shown in FIG. 14. In the filter unit operation step S1140, filter operations are performed such that a terminal filter headloss and filtered water turbidity were controlled to obtain an intermediate parameter value of 0.1 NTU, which occur synchronously as possible while maximizing a length of filter runs and filter efficiency. As shown in FIG. 11, the filter unit operation is the final unit operation. Thus, the system control can be implemented by maintaining a system control of the straight-line unit operation, the upflow clarifier unit operation and the recarbonation unit operation. From step S1140, control returns to step S1030.

In the third preferred embodiment of a method for controlling the UIWTP 100, a non-linear predictive model for the straight line unit operation, and in particular, turbidity, which can be performed as step S1110, will now be described. Parameters for other unit operations can be similarly evaluated by the third preferred embodiment. Similarly, other parameters for the straight-line operation can be evaluated according to the third preferred embodiment. In addition, successive or all unit operations can be evaluated by the third preferred embodiment. Accordingly, the third preferred embodiment will consider influent water quality, analyze treatment options available and control a dose of chemicals required to obtain an improved or optimum turbidity in real time.

All measured influent water quality parameters (e.g., of the UIWTP 100) were considered in the third preferred embodiment. Thus, the third preferred embodiment accounts for treatment differences caused by seasonal variation in temperature, type of turbidity and alkalinity. Such variations are important to control because the temperature of the water affects a rate of chemical reactions. Thus, for example, a detection time for colder water may require additional amounts of chemicals relative to warmer water. Further, physical properties of water like viscosity and surface tension are also affected. For example, for evaluations of the UIWTP 100, the temperature of the intake raw water varied between 32° F. and 90° F. (1993 operational data). Thus, seasonal differences in the type of turbidity can require a different type and level of treatment as provided in the third preferred embodiment. A level or amount of turbidity in the intake raw water depends on runoff events and varied between 0.1 and 300 NTU.

As shown in FIG. 12, the Straight Line Unit Operation included treatment processes for coagulation, flocculation and sedimentation. The goal of the Straight Line Unit Operation turbidity model was to predict the sedimentation basin effluent turbidity based on the influent conditions, the chemical additions, and the process operation. The state, control and output variables for the straight line (SL) treatment model are shown in Table 5.

TABLE 5

| Model Name | Manipulated Variables | Controlled Variables/Process Outputs | State Variables |
|---|---|---|---|
| SL Turbidity model | $Fe_2(SO_4)_3$ (t) | Turbidity (t+) | Raw water turbidity (t) Temperature (t) Months (Jan–Dec) (t) pH (t) |
| SL alkalinity model | $Fe_2(SO_4)_3$ (t) Jordan well water (t) | Alkalinity (t+) | Raw water alkalinity (t) |
| SL pH model | $Fe_2(SO_4)_3$ (t) Jordan well water (t) | pH (t+) | Raw water pH (t) |

Influent turbidity is a function of the season, river condition, reservoir turnover and rainfall or snow melt conditions. The coagulation, flocculation, and sedimentation processes are designed to remove this turbidity. Chemicals are added during the coagulation process and the flocs are agglomerated during the flocculation process. These flocs then settle under quiescent conditions in the sedimentation basin. Temperature is an important factor in this process, as it controls the rate of chemical reaction; the viscosity, density, and surface tension of water; and the settling rate of the flocs. The flow rate of water through the process affects the detention time, allowing more or less time for settlement of the flocs.

Potassium permanganate ($KMnO_4$) is an oxidizing agent. Its oxidizing power is effective in reducing color-induced turbidity. The chemical reduction of potassium permanganate (+7 state to +4 oxidation state) produces manganese dioxide ($MnO_2$) which acts as an coagulant aid, reducing the amount of primary coagulant required. Temperature, pH, ferrous ion concentration, and manganese concentration affect the performance of $KMnO_4$. The chemistry of this action is complex.

Ferric sulfate ($Fe_2(SO_4)_3 7H_2O$) is used as a coagulant in the water treatment plant. The effective pH range is 4–11 standard units, with the desired or optimum being more than 8.0. The effectiveness of ferric as an coagulant depends on the temperature of the raw water, the influent turbidity (type and amount), the amount of alkalinity present in the water, the pH of the water, and the mixing condition at the point of coagulant addition. Additional variables could include speed of the power mixer and speed of the flocculators in the flocculation basin.

Statistical (multiple linear regression) and deterministic models were developed for this unit operation. A validation data set was used to determine the efficacy of the models.

A SL Alkalinity Model according to the third preferred embodiment was developed to predict the alkalinity of the water after the SL unit operation. The factors affecting the effluent alkalinity from the process include the influent alkalinity, the dose of ferric sulfate, and the amount of well water added to the process. The state, control, and output variable for this model are shown in Table 5. Ferric sulfate is an acidic solution. The following reaction occurs when ferric sulfate is added to water: $Fe_2(SO4)_3 = 2Fe^+ + 3SO_4^-$ and $Fe^+ + 3H_2O = Fe(OH)_3 + 3H^+$. Considering stoichiometry, 1 mg of ferric sulfate destroys 0.75 mg of alkalinity expressed as mg/l of $CaCO_3$. The raw water parameter samples are collected before the inline power mixer. Well water can be mixed with the river water in the rapid mix basin. The Straight Line alkalinity effluent parameters include the effect of mixing of well water with river water.

Again, statistical and deterministic models were developed for the SL Alkalinity unit operation Model. The statistical model was determined by a regression model based on stepwise forward and stepwise backward regression analysis of the training data set was performed. The model having the highest correlation coefficient was applied to the test data set.

A deterministic model to predict the alkalinity of the water after the SL unit operation was determined by equation 2 as follows:

$$SL \text{ Alkalinity mg/l} = \frac{(x_1 * A + x_3 * B)}{A + B} - X2 * 0.75 * 0.98 \quad (2)$$

where X1=Influent Alkalinity, mg/l, X2=Ferric Sulfate Dose, mg/l, X3=Well Water Alkalinity, mg/l, A=River Flow, mg/l, B=Well Flow, mg/l, 0.75=Stoichiometric alkalinity destroyed by 1 mg of ferric sulfate; and 0.98=Purity of ferric sulfate purchased at The University of Iowa. The deterministic model was applied to the data sets and the results of all the models were compared.

The SL pH model predicted the pH of the sedimentation basin effluent based on the raw water pH, chemical additions, well water addition, and the process operation. The state control and the output variables for this model are shown in Table 5. The chemistry, the process dynamics and a statistical analysis of this model were similar to the SL alkalinity model.

Additional SL unit operation models to predict the coagulant dose and the $KMnO_4$ dose was developed according to the third preferred embodiment to determine the chemical feed rates to bring the SL effluent turbidity within the pre-established set point. These models were developed to help the operators to choose the desired or optimal combination of chemicals to achieve the set point turbidity values.

Figure 15:
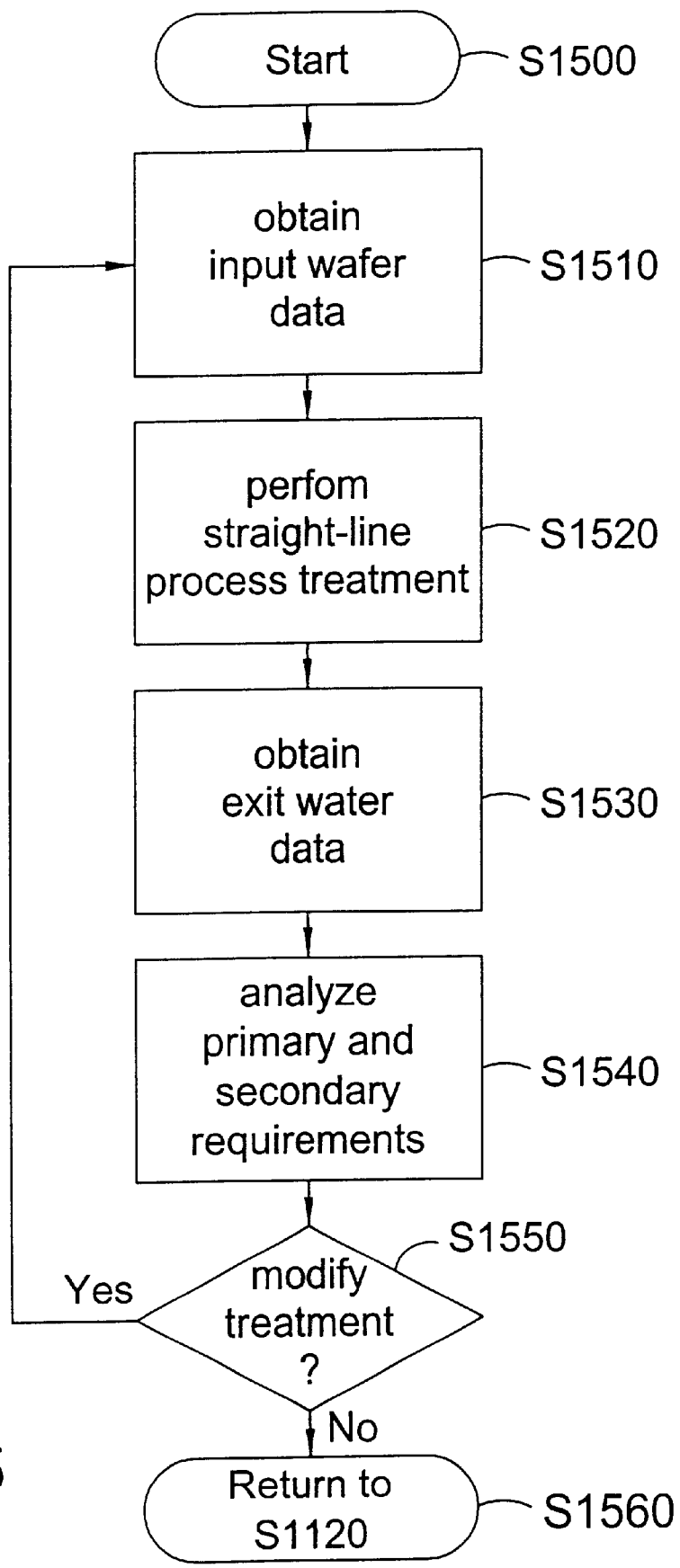
FIG. 15 is a flowchart of an exemplary process for a straight-line operation (turbidity)

An exemplary method for performing control of the straight-line unit operation control described in step S1110 will now be described with respect to FIG. 15. The straight-line unit operation control described instep S1110 could control, for example, the exemplary straight-line unit operation 160 for the UIWTP 100. As shown in FIG. 15, the process starts in step S1500 and continues to step S1510. In step S1510, the input water data to the straight-line unit operation is obtained. The input water data for the straight-line unit operation (turbidity) can include pH, alkalinity, POC, turbidity, hardness, temperature and flow. From step S1510, control continues to step S1520. In step S1520, the straight-line unit operation processes are performed and modeled with the desired granularity. In the UIWTP 100, the straight-line unit operation processes include power mix, rapid mix and sedimentation. From step S1520, controls continues to step S1530. In step S1530, the exit water data from the straight-line unit operation (turbidity) are obtained. Preferably, the water data on exit include turbidity, particle counts, alkalinity, POC, pH and hardness. From step S1530 control continues to step S1540.

In step S1540, primary and secondary requirements for the straight-line unit operation (turbidity) are evaluated. Primary requirements would include SWDA requirements. Secondary requirements would include cost, of power usage or chemical additives. The analysis performed in step S1540 would include determining treatment setpoints and evaluating intermediate parameters for the straight-line unit operation (turbidity).

Figure 16:
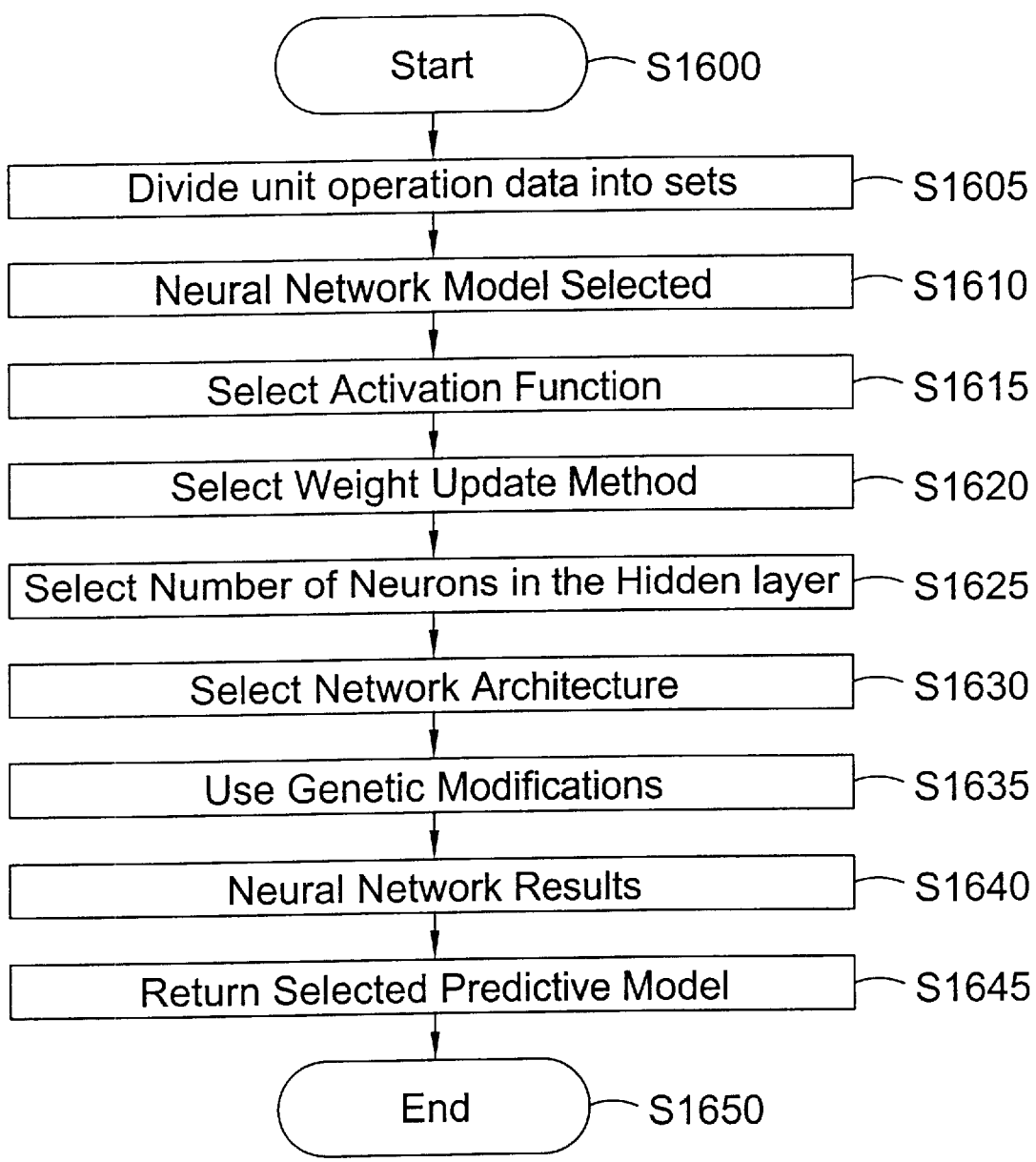
FIG. 16 is a flowchart of an exemplary process for modeling a selected activity.

These primary and secondary requirements are analyzed based on a predictive model of the unit operations. For example, the unit operations modeling unit 265 could be used to develop a predictive model of the unit operation for comparison to the primary and secondary requirements. An exemplary method for performing predictive modeling (e.g., unit operation modeling in step S1540) will now be described with respect to FIG. 16. As shown in FIG. 16, the process starts in step S1600 and continues to step S1605. In step S1605, the data such as unit operation data is divided into sets such as training and testing data sets. From step S1605, control continues to step S1610. In step S1610, one of a particular set of neural network models is selected for evaluation. From step S1610, control continues to step S1615. In step S1615, an activation function for the selected neural network model is evaluated and the function presenting relatively better (e.g., optimized) results is selected. From step S1615, control continues to step S1620 where alternative weight update approaches for the neural network model are evaluated and the approach presenting relatively better results is selected. From step S1620, control continues to step S1625 where a number of neurons in the hidden layer of the neural network model is evaluated, optimized and selected based on the predictive results. From step S1625, control continues to step S1630 where a neural network architecture of the model is evaluated and optimized for selection based on processing requirements and relative results. From step S1630, control continues to step S1635. In step S1635, a predictive improvement in accuracy and/or efficiency is determined based on modified genetic modeling modifications of the current existing neural network model. Then, the genetic modeling modification to the neural network model being evaluated is optimized and can be retained based on the predictive results. From step S1635, control continues to step S1640 where the results of various neural network models obtained in steps S1610–S1635 for the data provided as a result of step S1605 are compiled for the selected activity such as unit operations predictive estimation. For example, step S1640 can control repeated cycling through steps S1610 through S1635 for the data provided as a result of step S1605. From step S1640 control continues to step S1645 where a selected neural network model is provided. From step S1645, control continues to step S1650 where the process ends.

From step S1540, control continues to step S1550. In step S1550, the determined conditions are compared to the currently maintained control variables for the straight-line unit operation (turbidity) to determine if conditions warrant modification. For example, the ferric sulfate, potassium permanganate and other chemical use rate can be compared to mandated levels, minimum levels or alterations to current levels caused by predictive evaluations or user requests. If the result is affirmative because the treatment levels have changed in step S1540, the unit operation processes for the straight-line unit operation (turbidity) are modified and control returns to step S1520. However, if the results in step S1550 is negative, control continues to step S1560 where control returns to step S1120.

The Upflow Clarifier unit operation control performed in step S1120 is used for water softening and is a combination of flocculation, coagulation, precipitation, and sedimentation. An Upflow Clarifier unit operation involves application of basic water chemistry to continuous, uninterrupted flow regimes to produce finished water with desirable, consistent and predictable water qualities. Previously precipitated solids in the sludge blanket provide nuclei for the development of additional precipitates of calcium carbonate and magnesium hydroxide. The Upflow Clarifier unit operation control described in step S1120 could control, for example, the exemplary upflow clarifier unit operation 162 for the UIWTP 100 or the like. In step S1120, an UF Turbidity Model preferably predicts the upflow clarifier effluent turbidity based on the SL effluent conditions, the chemical additions, and the process operations. Exemplary state, control and output variables are shown in Table 6. The rate of precipitate formation of $CaCO_3$ is temperature dependent. Lime is added to the process to precipitate the hardness. Ferric sulfate is used as a coagulant to agglomerate the fine calcium and magnesium particles so they will settle more readily. Effluent hardness and alkalinity dictate how much precipitate will be produced. Additional variables to be considered can include, air introduction, turbine speed, amount of sludge withdrawal, and height of the sludge blanket.

Additional upflow clarifier unit operations control can include an upflow (UF) alkalinity model that predicts the Total and Phenolphthalein alkalinity in the upflow effluent water based on the SL water alkalinity and chemical additions. An UF pH Model predicts the upflow clarifier effluent pH based on the SL pH and chemical additions. An UF hardness Model predicts the total and calcium hardness based on SL hardness and chemical additions. Statistical baseline analysis can be performed for these models.

However, when considering temperature, continuous flow regime, time to reach equilibrium, effect of the already precipitated solids and the process operation, no models were found and no attempt was made to develop deterministic models.

TABLE 6

| Model Name | Manipulated Variables | Controlled Variables/ Process Outputs | State Variables/ Loads |
| --- | --- | --- | --- |
| Upflow Clarifier Turbidity Model | $Fe_2(SO_4)_3$ Dose | Turbidity (t+) | SL Turbidity (t) |
|  | Lime Dose |  | SST (5 min) (t) |
|  | Soda Ash Dose SL Turbidity (t), NTU |  | SL Alkalinity (t) SL Hardness (t) |
| Upflow alkalinity Model | $Fe_2(SO_4)_3$ Dose | Turbidity (t+) | SL Alkalinity (t) |
|  | Lime Dose Soda Ash Dose SL Turbidity (t), NTU |  | SL pH (t) SST (5 min) (t) |
| Upflow pH Model | $Fe_2(SO_4)_3$ Dose | Turbidity (t+) | SL Alkalinity (t) |
|  | Lime Dose Soda Ash Dose SL Turbidity (t), NTU |  | SL pH (t) SL Hardness (t) SST (5 min) (t) |
| Upflow hardness Model | $Fe_2(SO_4)_3$ Dose | Turbidity (t + detention time) | SL Hardness (t) |
|  | Lime Dose Soda Ash Dose SL Turbidity (t), NTU |  | SL Alkalinity (t) SL pH (t) SST (5 min) (t) |

From step S1120, control continues to step S1130, where the Recarbination unit operation control is performed. The Recarbination unit operation control in step S1130 could control, for example, the exemplary recarbination unit operation 164 for the UIWTP 100 or the like. From step S1130, control continues to step S1140.

Filters were the final barriers for the removal of turbidity from water. The filter unit operation control performed in step S1140 used variables that included particle size distribution, type of media, the concentration and characteristics of the solids in suspension, surface characteristics, organic vs. inorganic particles. Further, a method of operation including back washing, head loss time and time between backwashes. The filter unit operation control described in step S1140 could control, for example, the exemplary filter unit operation 166 for the UIWTP 100 or the like.

The mathematical prediction models describing gravity filtration can be divided into two parts: one relating to the rate of clarification or the theory of suspension removal, and the second relating to the increase in head loss due to clogging in the filter pores. Chemical addition and particle destabilization affect the size and shape of the particles. All of these models involve measurement of parameters like specific deposits, particle size, porosity, etc., which cannot be measured in real time. Filter operations can be effectively controlled by adequate pretreatment and online instrumentation for turbidity and/or particle size measurement. The models were developed to determine the amount of turbidity that can be allowed in the water that is applied onto the filter beds so that the filter run times can be maximized while maintaining water at or below recommended turbidity levels.

The filter unit operation control performed in step S1140 used a Filter Turbidity Model to predict the filter effluent turbidity. However, in the UIWTP, for example, the filters have different media; different models were developed for each set of filters. The state, control and output variables are shown in Table 6. The inlet turbidity reading for each of the filters was not available. Instead, this value was obtained by averaging the turbidity of the upflow clarifiers that were operational at that time. Statistical analysis similar to the SL Turbidity Model was performed for this model. However, no attempt was made to develop deterministic models.

TABLE 7

| Model Name | Manipulated Variables | Controlled Variables/ Process Outputs | State Variables |
| --- | --- | --- | --- |
| Filter Turbidity Model | Hours of Operation Head Loss UF Turbidity SL Turbidity (t) | Filter Effluent Turbidity (t + detention time) | Copopods (t) Algae (t) UF Turbidity (t) |

Turbidity is an important parameter in water treatment because of its relationship to filter performance. There are a lack of control systems for predicting the effluent turbidities from various unit operations involved in water treatment. There are several possible uses for predictive process models including easier operation of the process, better effluent water quality control, and maintenance of water quality parameters within EPA required limits at all times. Neural networks can be used for developing process-specific prediction models. These models can be combined in a variety of ways to develop overall system models. Genetic algorithms are one of the methods that can be used for system efficiency or optimization.

As described above, preferred embodiments of methods and apparatus according to the present invention to predict effluent turbidity from input water quality parameters were developed for each unit operation of a conventional water treatment (including softening) at the University of Iowa Water Treatment Plant. Statistical techniques (multiple linear regression) were used to evaluate the preferred embodiments in effluent turbidity models for a sedimentation basin, upflow clarifier and filters.

Figure 17:
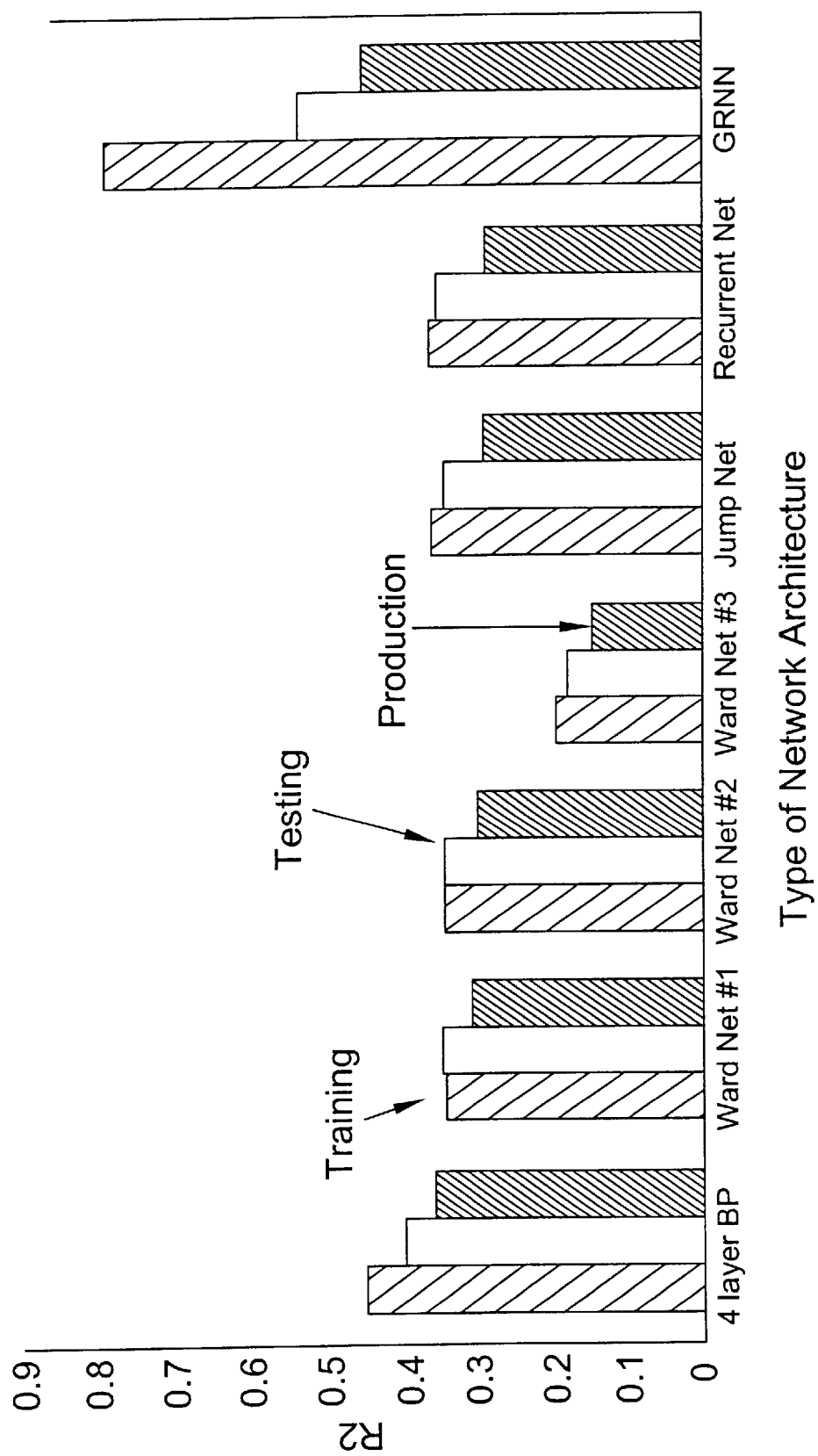
FIG. 17 is a diagram illustrating comparative results.

Results are shown in Table 8 and FIG. 17. The GRNN using the genetic method of interaction provided better unexpected results. This was likely because of the nature and working of the GRNN architecture where it generalizes over a region rather than a set point.

TABLE 8

| PARAMETER | TRAINING | TESTING | PRO-DUCTION | PATTERN |
|---|---|---|---|---|
| Four layered backpropagation architecture | | | | |
| $R^2$ | 0.4472 | 0.3930 | 0.3583 | 0.4150 |
| Mean Squared Error | 0.067 | 0.065 | 0.066 | 0.066 |
| Mean Absolute Error | 0.195 | 0.197 | 0.195 | 0.196 |
| Max Absolute Error | 2.723 | 1.432 | 1.452 | 2.723 |
| Ward Network Architecture # 1 | | | | |
| $R^2$ | 0.3431 | 0.3468 | 0.3078 | 0.3381 |
| Mean Squared Error | 0.079 | 0.070 | 0.071 | 0.075 |
| Mean Absolute Error | 0.213 | 0.207 | 0.206 | 0.210 |
| Max Absolute Error | 2.928 | 1.425 | 1.232 | 2.928 |
| Ward Network Architecture # 2 | | | | |
| $R^2$ | 0.3435 | 0.3435 | 0.2965 | 0.3353 |
| Mean Squared Error | 0.079 | 0.070 | 0.072 | 0.075 |
| Mean Absolute Error | 0.212 | 0.208 | 0.208 | 0.210 |
| Max Absolute Error | 2.898 | 1.405 | 1.211 | 2.898 |
| Ward Network Architecture # 3 | | | | |
| $R^2$ | 0.1910 | 0.1753 | 0.1411 | 0.1775 |
| Mean Squared Error | 0.098 | 0.089 | 0.088 | 0.093 |
| Mean Absolute Error | 0.239 | 0.235 | 0.232 | 0.237 |
| Max Absolute Error | 2.893 | 1.557 | 1.285 | 2.893 |
| Jump Architecture | | | | |
| $R^2$ | 0.3591 | 0.3435 | 0.2886 | 0.3420 |
| Mean Squared Error | 0.077 | 0.070 | 0.073 | 0.074 |
| Mean Absolute Error | 0.210 | 0.208 | 0.209 | 0.209 |
| Max Absolute Error | 2.903 | 1.321 | 1.263 | 2.903 |
| Recurrent Architecture | | | | |
| $R^2$ | 0.3632 | 0.3536 | 0.2876 | 0.3508 |
| Mean Squared Error | 0.077 | 0.069 | 0.073 | 0.073 |
| Mean Absolute Error | 0.211 | 0.206 | 0.207 | 0.208 |
| Max Absolute Error | 2.906 | 1.351 | 1.207 | 2.887 |

In unit operations investigated, neural network based effluent turbidity models according to the preferred embodiments were better than the statistical regression models. For the sedimentation basin, the coefficient of determination $R^2$ was 0.54 for the neural network model for the production data (verification data set, n=1359). The $R^2$ of the multiple linear regression on similar data set was 0.18 (n=1359). The comparative $R^2$ values for the upflow clarifier effluent turbidity for the pattern (full data set, n=3500) were 0.37 and 0.078 for the neural network and the statistical model respectively. For the filters, the $R^2$ for the neural network model ranged from 0.32 to 0.97 on the pattern data set, while $R^2$ on the same data set for the multiple linear regression model ranged form 0.011 to 0.168.

Further, General Regression Neural Network (GRNN) performed better than all other neural network architectures. The $R^2$ for the sedimentation basin effluent turbidity was 0.51 on the production file. The three-layered backpropagation architecture with turboprop learning method was lower in performance with $R^2$ of 0.35 on the production (verification file). Performance of all other neural network architectures was inferior to these two architectures.

In addition, genetic algorithms led to better neural network models. The $R^2$ on the production file improved from 0.51 to 0.54, and the mean squared error was reduced from 0.056 to 0.046 NTU with genetic optimization.

Neural network and statistical models were developed for pH and alkalinity for the sedimentation basin and upflow clarifier, and a system model was developed for a complete Water Treatment Plant. The outputs of one unit operation model were the inputs for successive downstream unit operation models. Genetic algorithms helped in developing better system models. Models were developed for pH, alkalinity, calcium hardness, total hardness, lime feed requirement, Sludge Settling Time (SST), filter head loss and chlorine residuals with good agreement (even better than for turbidity).

Different scaling and activation functions were not able to improve the performance of the sigmoid function for the backpropagation neural network architecture. Increasing the number of neurons in the hidden later increased the performance initially. The performance decreased when the number of neurons in the hidden layer was increased past the optimum number. The optimum number of neurons in the hidden layer for the sedimentation basin effluent turbidity model was 132 neurons.

As discussed above, the preferred embodiments have various advantages. Water treatment processes are essentially non-linear. Systems and methods become very complicated when an output of one non-linear process becomes an input for another non-linear process. The preferred embodiments described a relationship between system input and system output, which allows control of system output. This even holds true for parameters like turbidity, which is a highly variable parameter. The preferred embodiments further evaluate and control at a unit operation level. The controlling unit operations allow for prediction capabilities for system optimization. Such predictive capabilities help in system control that also meet regulatory standards including intermediate requirements. In addition, the preferred embodiments control for a selected variable for optimizing or improving other secondary parameters. In addition, the preferred embodiments consider all water quality parameters before optimizing the system for turbidity.

Actual data obtained from in-use monitoring of the UIWTP 100 provided initial raw data for analysis and evaluation of the preferred embodiments according to the present invention. Plots of monitoring data for water quality parameters against time were constructed to determine water quality trends. Plots for all the measured raw water quality parameters like Turbidity, Total Alkalinity, Hardness (both Calcium and Total), pH and Temperature were developed and analyzed. Turbidity monitoring data for sedimentation basin, upflow clarifier, filter, and clear well effluent were analyzed. Table 9 shows the summary of statistical analysis results for the influent water quality parameters for data from the UIWTP 100. In order to meet a 0.1 NTU final turbidity goal, a plant preferably has the capability of treating all values of raw water turbidity.

TABLE 9

| PARAMETER | MEAN | MEDIAN | MAXIMUM | STD DEVIATION |
|---|---|---|---|---|
| Turbidity, NTU | 18.66 | 13 | 321 | 20.11 |
| Temperature, °F. | 59.30 | 61 | 86 | 16.72 |
| PH | 8.02 | 8 | 8.9 | 0.25 |
| Total Alkalinity, mg/l | 227.59 | 230 | 360 | 48.17 |
| Calcium Hardness, mg/l | 170.95 | 174 | 324 | 39.79 |
| Total Hardness, mg/l | 260.70 | 266 | 486 | 56.06 |
| Ferric Sulfate, mg/l | 34.35 | 25 | 298 | 30.99 |
| KMnO4,mg/l | 0.975 | 0.96 | 2.97 | 0.46 |

The sedimentation basin effluent turbidity did not show any distinct pattern or a trend with respect to time. Sedimentation basin monitoring data for the UIWTP 100 for turbidity is shown in Table 10.

TABLE 10

| EFFLUENT TURBIDITY | RESULT |
|---|---|
| Maximum | 21.9 NTU |
| Minimum | 0.08 NTU |
| Median | 1.7 NTU |
| Mean | 1.84 NTU |
| Standard Deviation | 0.898 NTU |
| Excursion above 2 NTU | 2510 |
| Excursion Above 5 NTU | 45 |
| Average Removal efficiency | 80.71% |
| Lowest removal efficiency | 0% |
| Highest removal efficiency | 99.81% |

The effluent turbidity from the upflow clarifier is highly variable. Upflow Clarifier effluent turbidity observations for data from the UIWTP 100 are shown in Table 11.

TABLE 11

| PARAMETER | UF #1 | UF #2 | UF #3 |
|---|---|---|---|
| Number of observations | 5101 | 4504 | 5341 |
| Maximum turbidity, NTU | 18 | 20 | 28 |
| Minimum turbidity, NTU | 0.04 | 0.04 | 0.02 |
| Median turbidity, NTU | 1 | 1 | 0.78 |
| Mean turbidity, NTU | 1.67 | 1.59 | 1.18 |
| Standard Deviation, NTU | 1.87 | 1.64 | 1.39 |
| Excursion above 2 NTU | 1326 | 1150 | 742 |

Continuous Filter effluent turbidity data as recorded by online turbiditimeters were collected. Statistical analysis results for data of the UIWTP 100 for the Filter effluent turbidity are given in Table 12.

TABLE 12

| FILTER | MEAN NTU | MAXIMUM NTU | STANDARD DEVIATION NTU | VALUES GREATER THAN 0.1 NTU |
|---|---|---|---|---|
| Filter 1 | 0.035 | 0.48 | 0.026 | 117 |
| Filter 2 | 0.055 | 0.482 | 0.137 | 129 |
| Filter 3 | 0.031 | 0.273 | 0.0184 | 152 |
| Filter 4 | 0.033 | 0.451 | 0.022 | 236 |
| Filter 5 | 0.0284 | 0.188 | 0.011 | 7 |
| Filter 6 | 0.0275 | 0.148 | 0.006 | 7 |

Clear well turbidity trend graphs show that the average finished water turbidity is generally less than 0.1 NTU. Statistical analysis results for the UIWTP 100 of the clear well turbidity data is shown in Table 13. The effluent turbidity exceeded 0.1 NTU on a number of occasions (144 instances) and went as high as 0.5 NTU. The plant effluent turbidity for the UIWTP 100 continuous data is shown in Table 14.

TABLE 13

| PARAMETER | VALUE, NTU |
|---|---|
| Mean turbidity, NTU | 0.07 |
| Median turbidity, NTU | 0.07 |
| Standard Deviation, NTU | 0.0264 |
| Maximum turbidity, NTU | 1.1 |
| Minimum turbidity, NTU | 0.005 |
| Total Number of Observations | 7519 |

TABLE 14

| PARAMETER | VALUE, NTU |
|---|---|
| Mean turbidity, NTU | 0.033 |
| Median turbidity, NTU | 0.028 |
| Standard Deviation, NTU | 0.018 |
| Maximum turbidity, NTU | 0.496 |
| Minimum turbidity, NTU | 0.019 |
| Number of Excursion above 0.1 NTU | 144 |
| Total Number of Observations | 16383 |

The data set for each unit operation was divided into training, testing and validation data sets. Analysis was performed on all these individual data sets and the parent pattern (entire data set) such as the statistical student's t-test. As shown in Tables 15–16, a comparison of the different data sets with parent data set, based on both raw water turbidity and sedimentation basin turbidity for data of the UIWTP 100, respectively, shows all four data sets are statistically similar and that there is no significant difference in the means between various data sets.

TABLE 15

| RIVER TURBIDITY | PATTERN | VALIDATION | TRAINING | TESTING |
|---|---|---|---|---|
| # of points | 6573 | 1359 | 3144 | 2070 |
| Mean | 18.47 | 18.75 | 18.52 | 18.20 |
| Median | 13 | 13 | 13 | 13 |
| Maximum | 321 | 210 | 321 | 263 |
| Standard Deviation | 19.373 | 19.64 | 20.40 | 18.75 |
| Two tailed P value* | — | 0.628 | 0.903 | 0.577 |

TABLE 16

| PARAMETERS | PATTERN | VALIDATION | TRAINING | TESTING |
|---|---|---|---|---|
| # of points | 6573 | 1359 | 3144 | 2070 |
| Mean | 1.833 | 1.826 | 1.84 | 1.828 |
| Median | 1.7 | 1.8 | 1.7 | 1.7 |
| Maximum | 5 | 4.5 | 5 | 5 |
| Std Deviation | 0.6288 | 0.6036 | 0.642 | 0.6227 |
| Two tailed P Value* | — | 0.713 | 0.643 | 0.733 |

The variables used for SL Treatment statistical model development and the associated regression coefficients are shown in Table 17. The results indicate that the coefficient of multiple determination ($R^2$) ranged from 0.14 to 0.19 for the sedimentation basin effluent turbidity of data for the UIWTP (Table 18).

TABLE 17

| REGRESSION MODEL VARIABLES | REGRESSION COEFFICIENT |
|---|---|
| January | 0 |
| February | −0.004 |
| March | −0.311 |
| April | −0.146 |
| May | −0.297 |
| June | 0.017 |
| July | 0.184 |
| August | 0.079 |
| September | 0.000 |
| October | 0.003 |
| November | 0.039 |
| December | −0.013 |
| River water turbidity | 0.185 |
| River water alkalinity | −0.226 |
| River pH | 0.000 |
| KMnO4 | 0.026 |
| Ferric sulfate | −0.144 |
| River Water Temperature | −0.264 |

TABLE 18

| DATASET | $R^2$ COEFFICIENT OF MULTIPLE DETERMINATION. |
|---|---|
| Training | 0.194 |
| Testing | 0.190 |
| Validation | 0.142 |
| Pattern | 0.183 |

As an exemplary process to generate non-linear equation, for example, a three layer neural network was developed using variables identified in Table 17, including raw water temp, turbidity, alkalinity, pH, $KMnO_4$ dose, ferric dose and seasons (using months). The performance of the network for various data sets for predicting sedimentation basin turbidity is shown in Table 19. The input parameters and the weights associated with these inputs for the three-layered backpropagation type neural network are shown in Table 20 for data of the UIWTP 100.

Neural networks include variables like the number of neurons, the scaling functions, the activation functions, the weight update method, and the architecture of the network. There is very little data on effects of these variables on the performance of the neural networks even for process modeling of unit operations similar to those found in water treatment. Simulation runs were made to study the effect of these variables on such network performance and to determine the optimal or improved neural network architecture for process modeling of water treatment unit operations.

TABLE 19

| PARAMETER | TRAINING | TESTING | PRODUCTION | PATTERN |
|---|---|---|---|---|
| $R^2$ | 0.2096 | 0.2124 | 0.1851 | 0.2062 |
| Mean Squared Error | 0.096 | 0.085 | 0.084 | 0.090 |
| Mean Absolute Error | 0.236 | 0.229 | 0.228 | 0.232 |
| Min Absolute Error | 0.000 | 0.000 | 0.000 | 0.000 |
| Max Absolute Error | 2.893 | 1.481 | 1.269 | 2.893 |

TABLE 20

| MODEL INPUT PARAMETER | WEIGHT |
|---|---|
| January | 9.23177 |
| February | 10.28358 |
| March | 9.38795 |
| April | 9.45025 |
| May | 10.29663 |
| June | 10.70685 |
| July | 11.38127 |
| August | 9.62390 |
| September | 9.58555 |
| October | 10.22146 |
| November | 10.99401 |
| December | 9.91966 |
| River water turbidity | 12.29335 |
| River water alkalinity | 10.57143 |
| River pH | 11.57056 |
| $KmnO_4$ | 10.35415 |
| Ferric sulfate | 10.06178 |
| River Water Temperature | 10.57592 |

Weights do not necessarily indicate the importance of the input parameter. The presence of a large weight connecting an input to a neuron does not mean the input is important. Hidden neurons may have very small weights however connecting it to the output neuron. The reverse can be true for inputs with low weights associated with them.

Effect of Scaling Function is shown by the tanh and the logistic function scaling functions. This model results for a three-layered backpropagation neural network with tanh scaling function for the sedimentation basin effluent turbidity for different data sets for the UIWTP 100 are shown in Table 21. The network performance is poor as compared to the performance with the logistic scaling function.

TABLE 21

| PARAMETER | TRAINING | TESTING | PRODUCTION | PATTERN |
|---|---|---|---|---|
| $R^2$ | 0.1980 | 0.2050 | 0.1813 | 0.1973 |
| Mean Squared Error | 0.097 | 0.085 | 0.084 | 0.091 |
| Mean Absolute Error | 0.237 | 0.230 | 0.228 | 0.233 |
| Max Absolute Error | 2.884 | 1.409 | 1.185 | 2.884 |

Different activation functions can lead to different degrees of generalization of the data and control the power and performance of the network. Different types of activation functions, for example, were used to see the effect on network performance. Table 22 shows different activation functions used for model development for predicting the sedimentation basin effluent turbidity for data of the UIWTP 100.

TABLE 22

| MODEL NAME | SCALING FUNCTION | ACTIVATION FUNCTION |
|---|---|---|
| Model 1 | Logistic | Logistic |
| Model 2 | Logistic | Tanh |
| Model 4 | Logistic | Tanh 15 |
| Model 5 | Logistic | Symmetrical logistic |
| Model 6 | Logistic | Gaussian/Gaussian complement |

Network performance of various model results for a three-layered backpropagation neural network with different activation functions is shown in Table 23. The comparative analysis of performance of various models shows that the logistic activation function provides better unexpected results out of all the activation functions examined.

TABLE 23

| PARAMETER | TRAINING | TESTING | PRO-DUC-TION | PATTERN |
|---|---|---|---|---|
| Three layered backpropagation with tanh activation function | | | | |
| $R^2$ | 0.1434 | 0.1447 | 0.1268 | 0.1410 |
| Mean Squared Error | 0.104 | 0.092 | 0.090 | 0.097 |
| Mean Absolute Error | 0.246 | 0.240 | 0.235 | 0.242 |
| Min Absolute Error | 0.000 | 0.000 | 0.000 | 0.000 |
| Max Absolute Error | 2.980 | 1.490 | 1.266 | 2.980 |
| Three-layered backpropagation neural network with tanh 15 activation function | | | | |
| $R^2$ | 0.000 | 0.0000 | 0.000 | 0.000 |
| Mean Squared Error | 1.206 | 1.203 | 1.175 | 1.199 |
| Mean Absolute Error | 1.041 | 1.046 | 1.035 | 1.042 |
| Min Absolute Error | 0.022 | 0.008 | 0.018 | 0.008 |
| Max Absolute Error | 4.122 | 2.506 | 2.285 | 4.122 |
| Three-layered backpropagation neural network with symmetrical logistic activation function | | | | |
| $R^2$ | 0.2098 | 0.2142 | 0.1879 | 0.2074 |
| Mean Squared Error | 0.096 | 0.084 | 0.084 | 0.090 |
| Mean Absolute Error | 0.235 | 0.229 | 0.227 | 0.232 |
| Min Absolute Error | 0.000 | 0.000 | 0.000 | 0.000 |
| Max Absolute Error | 2.888 | 1.484 | 1.270 | 2.888 |
| Three-layered backpropagation neural network with Gaussian and Gaussian complement activation function. | | | | |
| $R^2$ | 0.0177 | 0.000 | 0.000 | 0.0022 |
| Mean Squared Error | 0.119 | 0.108 | 0.105 | 0.113 |
| Mean Absolute Error | 0.271 | 0.265 | 0.258 | 0.266 |
| Min Absolute Error | 0.000 | 0.000 | 0.000 | 0.000 |
| Max Absolute Error | 2.979 | 1.359 | 1.188 | 2.979 |

In the present analyses according to the present invention, there is a remarkable difference in the training speed of various networks for predicting the sedimentation basin effluent turbidity as shown in Table 24. Performances of neural network with the logistic and symmetric logistic activation function was better than the neural networks with other kind of activation functions. However, the training speed for the neural network with the symmetric logistic function was less than the training speed for the neural network with logistic function. The symmetric logistic function may be useful in situations where online network training speed is an increasingly weighted or important factor.

TABLE 24

| MODEL NAME | ACTIVATION FUNCTION | TRAINING SPEED (H:M:S) |
|---|---|---|
| Model 1 | Logistic | 00:45:54 |
| Model 2 | Tanh | 00:06:36 |
| Model 4 | Tanh15 | 00:05:33 |
| Model 5 | Symmetrical logistic | 00:15:17 |
| Model 6 | Gaussian/Gaussian complement | 00:07:37 |

The momentum method, for example, is used to prevent local minima in learning. Increases in the momentum can lead to better network performance when the network attains global minima rather than local minima. Network performance momentum was varied between 0.1 to 0.2 to evaluate such effects. Results of varying an increase in the momentum on the performance of the neural network for predicting the sedimentation basin effluent turbidity for the UIWTP 100 are shown in Table 25.

TABLE 25

| PARAMETER | TRAINING | TESTING | PRO-DUC-TION | PATTERN |
|---|---|---|---|---|
| $R^2$ | 0.1916 | 0.1912 | 0.1713 | 0.1880 |
| Mean Squared Error | 0.098 | 0.087 | 0.085 | 0.092 |
| Mean Absolute Error | 0.238 | 0.232 | 0.228 | 0.234 |
| Minimum Absolute Error | 0.000 | 0.000 | 0.000 | 0.000 |
| Maximum Absolute Error | 2.878 | 1.398 | 1.183 | 2.878 |

Different type of training methods, for example, were used to determine the if training methods have an effect on network performance. Rotation, vanilla, and Turboprop™ training methods were tested for effect on predicting sedimentation basin effluent turbidity on training with various data sets for the UIWTP 100 as shown in Table 26. The Turboprop™ training better unexpected results can be attributed to a method of weight update that can be less sensitive to a learning state or momentum weight update. Weights for a neural network trained to predict sedimentation basin effluent turbidity using Turboprop™ method for data from the UIWTP 100 are shown in Table 27.

TABLE 26

| PARAMETER | ROTATION | VANILLA | TURBOPROP |
|---|---|---|---|
| Training data set | | | |
| $R^2$ | 0.0749 | 0.2095 | 0.3921 |
| Mean Squared Error | 0.112 | 0.096 | 0.073 |
| Mean Absolute Error | 0.258 | 0.236 | 0.204 |
| Minimum Absolute Error | 0.000 | 0.000 | 0.000 |
| Maximum Absolute Error | 3.059 | 2.894 | 2.871 |
| Testing data set | | | |
| $R^2$ | 0.0414 | 0.2118 | 0.3714 |
| Mean Squared Error | 0.103 | 0.085 | 0.067 |
| Mean Absolute Error | 0.253 | 0.229 | 0.202 |
| Minimum Absolute Error | 0.000 | 0.001 | 0.000 |
| Maximum Absolute Error | 1.611 | 1.480 | 1.336 |
| Production data set | | | |
| $R^2$ | 0.0545 | 0.1850 | 0.338 |
| Mean Squared Error | 0.097 | 0.084 | 0.069 |
| Mean Absolute Error | 0.246 | 0.228 | 0.201 |
| Minimum Absolute Error | 0.001 | 0.000 | 0.000 |
| Maximum Absolute Error | 1.391 | 1.268 | 1.196 |

TABLE 26-continued

| PARAMETER | ROTATION | VANILLA | TURBOPROP |
|---|---|---|---|
| Pattern data set | | | |
| $R^2$ | 0.0611 | 0.206 | 0.3755 |
| Mean Squared Error | 0.106 | 0.090 | 0.071 |
| Mean Absolute Error | 0.254 | 0.232 | 0.203 |
| Minimum Absolute Error | 0.000 | 0.000 | 0.000 |
| Maximum Absolute Error | 3.059 | 2.894 | 2.871 |

TABLE 27

| MODEL INPUT PARAMETER | WEIGHT, INPUT TO HIDDEN LAYER |
|---|---|
| January | 15.25875 |
| February | 19.13787 |
| March | 42.01798 |
| April | 25.95069 |
| May | 20.62940 |
| June | 19.83706 |
| July | 37.80744 |
| August | 19.82856 |
| September | 23.20638 |
| October | 20.69475 |
| November | 16.58407 |
| December | 16.34513 |
| River water turbidity | 39.09117 |
| River water alkalinity | 51.98909 |
| River pH | 23.01341 |
| $KMnO_4$ | 30.10954 |
| Ferric Sulfate | 50.12400 |
| River Water Temperature | 49.93341 |

Additional efforts increased and decreased the number of neurons from a standard prescribed number earlier used to determine effects on the generalization ability of a neural network. Results indicate that the network (e.g., three-layered backpropagation neural network) performance generally decreases with the decrease in the number of neurons and increases with the increase in the number of neurons. However, overall performance actually decreases in terms of maximum absolute error when the number of neurons is increased to 132 from 66. Results with different numbers of neurons in the hidden layer are shown in Table 28.

TABLE 28

| PARAMETER | TRAINING | TESTING | PRODUCTION | PATTERN |
|---|---|---|---|---|
| Three layered backpropagation with 33 neurons in hidden layer | | | | |
| $R^2$ | 0.0131 | 0.0176 | 0.0036 | 0.0129 |
| Mean Squared Error | 0.119 | 0.105 | 0.103 | 0.112 |
| Mean Absolute Error | 0.265 | 0.256 | 0.250 | 0.259 |
| Minimum Absolute Error | 0.000 | 0.000 | 0.000 | 0.000 |
| Maximum Absolute Error | 3.005 | 1.423 | 1.197 | 3.005 |
| Three layered backpropagation with 132 neurons in hidden layer | | | | |
| $R^2$ | 0.4070 | 0.3940 | 0.3527 | 0.3935 |
| Mean Squared Error | 0.072 | 0.065 | 0.067 | 0.069 |
| Mean Absolute Error | 0.201 | 0.197 | 0.197 | 0.199 |
| Min Absolute Error | 0.000 | 0.000 | 0.000 | 0.000 |
| Max Absolute Error | 2.852 | 1.535 | 1.322 | 2.852 |
| Three layered backpropagation with 268 neurons in hidden layer | | | | |
| $R^2$ | 0.3694 | 0.3660 | 0.3148 | 0.3588 |
| Mean Squared Error | 0.076 | 0.068 | 0.071 | 0.072 |
| Mean Absolute Error | 0.208 | 0.205 | 0.205 | 0.206 |
| Min Absolute Error | 0.000 | 0.000 | 0.000 | 0.000 |
| Max Absolute Error | 2.923 | 1.296 | 1.140 | 2.923 |
| Three layered backpropagation with 528 neurons in hidden layer | | | | |
| $R^2$ | 0.3155 | 0.2928 | 0.2655 | 0.2998 |
| Mean Squared Error | 0.083 | 0.076 | 0.076 | 0.079 |
| Mean Absolute Error | 0.219 | 0.217 | 0.214 | 0.217 |
| Min Absolute Error | 0.000 | 0.000 | 0.000 | 0.000 |
| Max Absolute Error | 2.932 | 1.458 | 1.311 | 2.932 |

Neural network architectures may be able to generalize data such as unit operations data better than others. Efforts were conducted to see if any of networks architectures such as ward, jump, 4 layer other than a three-layered, turboprop type of neural network can be identified as a better neural network architecture. Results of different network architectures in predicting the sedimentation basin effluent turbidity are shown in Table 8 and Table 29. The results indicate that GRNN type of neural network had the best performance and generalized better on all the different data sets. An ability of the GRNN is to adapt to any kind of surface by using different smoothing factors. The other types of neural network architectures are trying to develop equations for a particular output by using a combination of the inputs. This approach may work well for a system when the outputs are well controlled. In the case of water treatment (maybe for other natural systems), an output cannot be truly controlled or defined due to noise and disturbances in the system. For example, there is a long detention time, which makes the output at the end of the basin an average for the time period rather than a single, definite value. This may provide the failure of a backpropagation type of network architecture. GRNN, with its ability to quickly adapt to the surface and then use all the values that it can use for the development of the equation, does a better job of dealing with the long detention time, according to the present invention.

Under the GRNN architecture, distance can be measured either as a Euclidean distance or as a city block distance. Comparison of network performance under these two distance measurement techniques indicate that the network performance is better under city block technique (Table 30) as compared to the Euclidean technique (Table 29) in predicting sedimentation basin effluent turbidity for data at the UIWTP 100. The city block measure of distance is not as accurate as the Euclidean measure. Better performance of the city block distance measurement could be due to the noise in the data.

TABLE 29

| PARAMETER | TRAINING | TESTING | PRODUCTION | PATTERN |
|---|---|---|---|---|
| $R^2$ | 0.7895 | 0.5352 | 0.4533 | 0.6522 |
| Mean Squared Error | 0.025 | 0.050 | 0.056 | 0.039 |
| Mean Absolute Error | 0.114 | 0.167 | 0.172 | 0.142 |
| Min Absolute Error | 0.000 | 0.000 | 0.001 | 0.000 |
| Max Absolute Error | 1.674 | 1.283 | 1.384 | 1.674 |

TABLE 30

| PARAMETER | TRAINING | TESTING | PRODUCTION | PATTERN |
|---|---|---|---|---|
| $R^2$ | 0.881 | 0.5733 | 0.5098 | 0.7248 |
| Mean Squared Error | 0.014 | 0.046 | 0.050 | 0.031 |
| Mean Absolute Error | 0.082 | 0.161 | 0.162 | 0.123 |
| Max Absolute Error | 1.055 | 1.185 | 1.309 | 1.309 |

An extension of the GRNN technique is combining of genetic prediction (e.g., optimization) technique with the GRNN architecture. Fitness of the function is the mean squared error of the outputs. The genetic function preferably seeks to minimize the fitness. The genetic feature was used on the GRNN with city block distance measurement technique. The results of performance of GRNN (with genetic modification or optimization) in predicting the sedimentation basin effluent turbidity for data of the UIWTP 100 are shown in Table 31 and indicate that the genetic version increases the $R^2$ for test data set and the production data set and decreases it for the training data set. It also improves the performance of the network on all other performance measures for the production data set.

TABLE 31

| PARAMETER | TRAINING | TESTING | PRODUCTION | PATTERN |
|---|---|---|---|---|
| $R^2$ | 0.855 | 0.5980 | 0.5314 | 0.7191 |
| Mean Squared Error | 0.018 | 0.043 | 0.048 | 0.032 |
| Mean Absolute Error | 0.097 | 0.155 | 0.158 | 0.128 |
| Max Absolute Error | 1.220 | 1.091 | 1.254 | 1.254 |

Models for SL Alkalinity

Models to predict the sedimentation basin effluent alkalinity according to the present invention were developed using deterministic, statistical and neural network approaches. A methodology, similar to the one used in the sedimentation basin effluent turbidity model, was used for model development. The comparative $R^2$ for the pattern file for the different models in predicting the sedimentation basin effluent alkalinity for data of the UIWTP 100 are shown in Table 32.

TABLE 32

| MODEL | $R^2$ |
|---|---|
| Deterministic Model | 0.46 |
| Statistical model | 0.88 |

TABLE 32-continued

| MODEL | $R^2$ |
|---|---|
| Neural network model (production data set) | 0.77 |
| Neural network model (pattern data set) | 0.72 |

The comparative results for different models (e.g., SL pH) in predicting the sedimentation basin effluent pH for data of the UIWTP 100 are shown in Table 33. Based on the $R^2$ results, neural network models performed better than the statistical model.

TABLE 33

| MODEL | $R^2$ |
|---|---|
| Multiple Linear Regression Model | 0.773 |
| Neural network model (pattern data set) | 0.87 |
| Neural network model (production data set) | 0.82 |

The comparative results for different models (e.g., SL ferric sulfate dose) in predicting the coagulant dose for data of the UIWTP 100 are shown in Table 34. Based on the $R^2$ results, neural network models performed better than the statistical model on the straight line unit operation.

TABLE 34

| MODEL | $R^2$ |
|---|---|
| Statistical model without seasonal component | 0.54 |
| Statistical model with seasonal component | 0.635 |
| Neural network model (pattern data set) | 0.97 |
| Neural network model (production data set) | 0.95 |

A statistical analysis was conducted to see if potassium permanganate has any effect on sedimentation basin effluent turbidity. A correlation matrix (e.g., Pearson) for sedimentation basin effluent turbidity and various chemicals used in the SL unit operation for data of the UIWTP 100 shown in Table 35. Based on the correlation results, $KM_nO4$ had some effect on the SL effluent turbidity and opposite to that of the ferric sulfate effect. Statistical and neural network models were developed to predict the KMnO4 dose required to meet SL effluent turbidity goals. Comparative performance results of different models in predicting potassium permanganate dose for data of the UIWTP 100 are shown in Table 36.

TABLE 35

| CORRELATION PAIR | CORRELATION COEFFICIENT |
|---|---|
| KmnO4-SL turbidity | 0.030 |
| Ferric sulfate-SL turbidity | −0.023 |
| Raw water turbidity-SL turbidity | 0.249 |
| Ferric sulfate-KMnO4 | 0.40 |

TABLE 36

| MODEL | $R^2$ |
|---|---|
| Multiple Linear Regression Model | 0.392 |
| Neural network model (pattern data set) | 0.943 |
| Neural network model (production data set) | 0.86 |

Separate turbidity models were preferably developed for each up flow clarifier. The statistical model variables and their regression coefficient for the upflow clarifier effluent turbidity for data of the UIWTP 100 given in Table 37.

TABLE 37

| MODEL PARAMETER | REGRESSION COEFFICIENT |
|---|---|
| Constant | 2.695 |
| SL turbidity | 0.400 |
| SL alkalinity | 0.046 |
| SL total hardness | −1.189 |
| SL calcium hardness | 1.120 |
| SL pH | −0.262 |
| Total lime | 0.190 |
| Ferric sulfate | −0.067 |
| Soda ash | −0.018 |
| Water temperature | −0.251 |

$R^2 = 0.078$

Performance of the neural network based model on different data sets for upflow clarifier (e.g., UF1) turbidity for data of the UIWTP 100 is given in Table 38. Neural network models were developed for basin UF1, UF2 and UF3 with similar results. The performance of the neural network model is an improvement over the statistical model.

TABLE 38

| PARAMETER | TRAINING | TESTING | PRODUCTION | PATTERN |
|---|---|---|---|---|
| $R^2$ | 0.5809 | 0.1394 | 0.1351 | 0.3118 |
| Mean Squared Error | 0.243 | 0.490 | 0.512 | 0.398 |
| Mean Absolute Error | 0.385 | 0.568 | 0.584 | 0.500 |
| Min Absolute Error | 0.000 | 0.001 | 0.003 | 0.000 |
| Max Absolute Error | 1.888 | 2.30 | 2.099 | 2.300 |
| Max Absolute Error | 2.852 | 1.535 | 1.322 | 2.852 |

Statistical and neural network models were developed for predicting the phenolphthalein and total alkalinity for all the three softeners. Results were similar for all the three basins.

A single neural network model was developed for predicting the P alkalinity and the total alkalinity relative to separate statistical models. GRNN architecture with city block distance measure and genetic optimization technique was used for better results in model development and analysis. The results of neural network model in predicting upflow clarifier effluent alkalinity (P and Total) for the various data sets of the UIWTP 100 is presented in Table 39. The performance of the neural network model is better than the statistical models.

TABLE 39

| PARAMETER | TRAINING | TESTING | PRODUCTION | PATTERN |
|---|---|---|---|---|
| P alkalinity | | | | |
| $R^2$ | 0.7896 | 0.3758 | 0.3540 | 0.5340 |
| Mean Squared Error | 0.011 | 0.032 | 0.036 | 0.025 |
| Mean Absolute Error | 0.078 | 0.136 | 0.142 | 0.115 |
| Max Absolute Error | 0.515 | 1.086 | 1.058 | 1.086 |
| Total alkalinity | | | | |
| $R^2$ | 0.8108 | 0.4510 | 0.4360 | 0.5881 |
| Mean Squared Error | 0.009 | 0.027 | 0.028 | 0.020 |
| Mean Absolute Error | 0.070 | 0.125 | 0.126 | 0.104 |
| Min Absolute Error | 0.000 | 0.000 | 0.00 | 0.000 |
| Max Absolute Error | 0.436 | 0.940 | 0.726 | 0.940 |

A statistical model (multiple linear regression) and a neural network model was developed for predicting the effluent pH from the upflow clarifier. GRNN architecture with city block distance measure and genetic optimization technique was used for model development and analysis. The results of neural network model in predicting upflow clarifier effluent pH for the various data sets of the UIWTP 100 is presented in Table 40. The performance of the neural network model was better than the statistical model. All results are based on natural log conversion of data.

TABLE 40

| PARAMETER | TRAINING | TESTING | PRODUCTION | PATTERN |
|---|---|---|---|---|
| $R^2$ | 0.6808 | 0.3650 | 0.3757 | 0.4923 |
| Mean Squared Error | 0.029 | 0.057 | 0.058 | 0.046 |
| Mean Absolute Error | 0.131 | 0.186 | 0.190 | 0.165 |
| Min Absolute Error | 0.000 | 0.000 | 0.000 | 0.000 |
| Max Absolute Error | 0.748 | 0.941 | 0.936 | 0.941 |

Statistical and neural network based models were developed for each filter to predict its effluent turbidity. A neural network based model using the GRNN architecture, city block distance measure and genetic optimization technique was developed. Results of GRNN (with genetic optimization) in predicting the Filter 1 effluent turbidity for data of the UIWTP 100 are shown in Table 41. The performance of the model was better than the statistical model. Results of GRNN (with genetic optimization) in predicting the Filters 2–6 effluent turbidity for data of the UIWTP 100 are shown in Tables 42, 43, 44, 45, 46.

TABLE 41

| PARAMETER | PRODUCTION | PATTERN |
|---|---|---|
| $R^2$ | 0.0597 | 0.3248 |
| Mean Squared Error | 0.000 | 0.000 |
| Mean Absolute Error | 0.005 | 0.004 |
| Max Absolute Error | 0.133 | 0.133 |

TABLE 42

| PARAMETER | PRODUCTION | PATTERN |
|---|---|---|
| $R^2$ | 0.7516 | 0.8641 |
| Mean Squared Error | 0.000 | 0.000 |
| Mean Absolute Error | 0.002 | 0.001 |
| Minimum Absolute Error | 0.000 | 0.000 |
| Maximum Absolute Error | 0.046 | 0.096 |

TABLE 43

| PARAMETER | PRODUCTION | PATTERN |
|---|---|---|
| $R^2$ | 0.2282 | 0.5439 |
| Mean Squared Error | 0.000 | 0.000 |
| Mean Absolute Error | 0.004 | 0.002 |
| Minimum Absolute Error | 0.000 | 0.00 |
| Maximum Absolute Error | 0.287 | 0.287 |

TABLE 44

| PARAMETER | PRODUCTION | PATTERN |
|---|---|---|
| $R^2$ | 0.5207 | 0.7521 |
| Mean Squared Error | 0.000 | 0.000 |
| Mean Absolute Error | 0.003 | 0.002 |
| Minimum Absolute Error | 0.000 | 0.000 |
| Maximum Absolute Error | 0.277 | 0.277 |

TABLE 45

| PARAMETER | PRODUCTION | PATTERN |
|---|---|---|
| $R^2$ | 0.9565 | 0.9684 |
| Mean Squared Error | 0.000 | 0.000 |
| Mean Absolute Error | 0.001 | 0.001 |
| Max Absolute Error | 0.050 | 0.052 |

TABLE 46

| PARAMETER | PRODUCTION | PATTERN |
|---|---|---|
| $R^2$ | 0.9322 | 0.9408 |
| Mean Squared Error | 0.000 | 0.000 |
| Mean Absolute Error | 0.002 | 0.001 |
| Minimum Absolute Error | 0.000 | 0.000 |
| Maximum Absolute Error | 0.049 | 0.062 |

Figure 18:
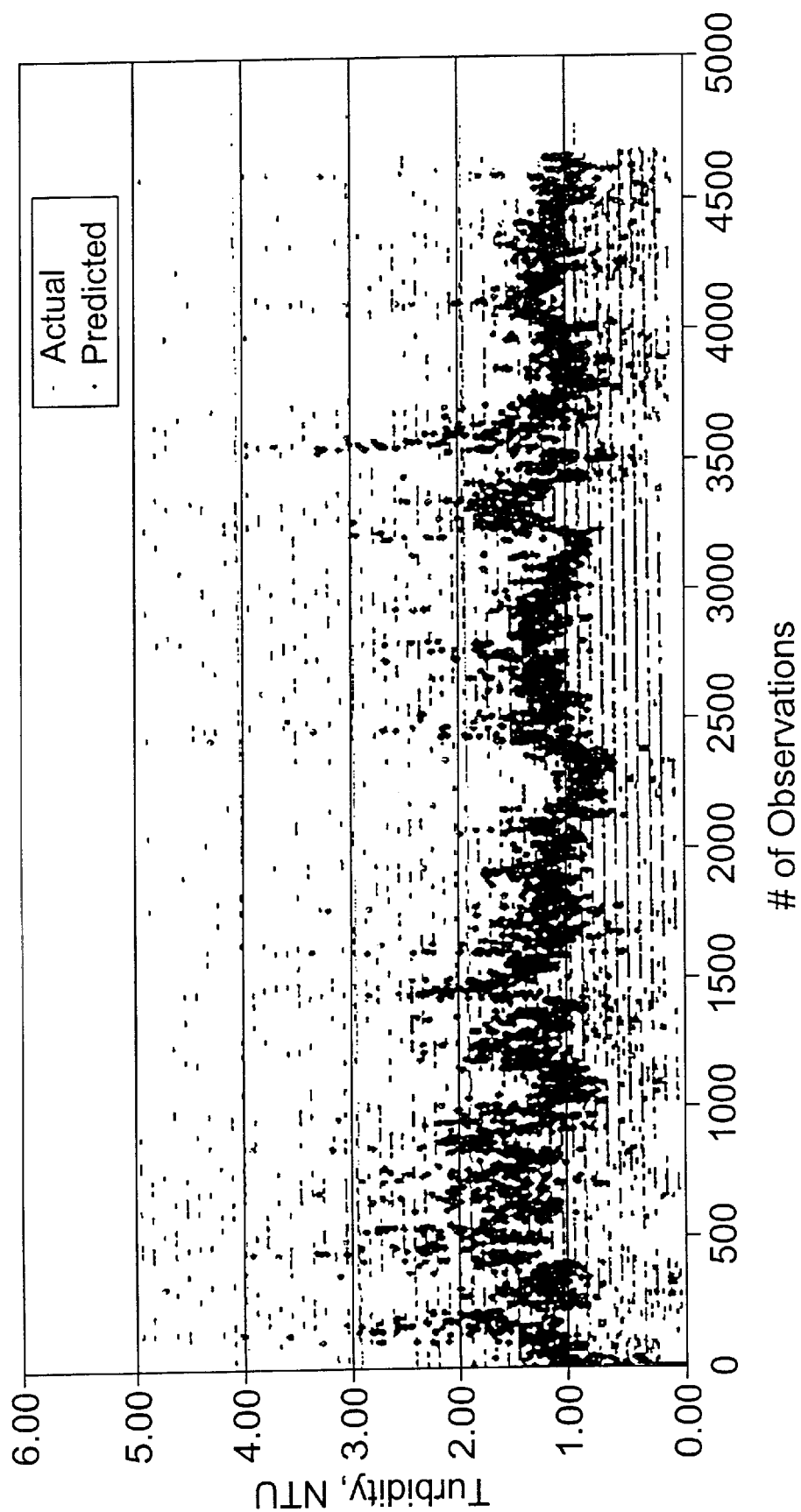
FIG. 18 is a diagram illustrating system comparative results according to a preferred embodiment of the present invention.

Lack of system models for the Water Plants that take into account the softening process, performance of the individual unit operations, or the type and number of unit operations in use is a disadvantage to the industry. The preferred embodiments of the system model and method according to the present invention were constructed using outputs of one process as the inputs for the next process. Preferably, only the control variables, like the chemical feeds, change through a system model. The preferred embodiments of systems and methods were able to predict all the plant effluent parameters based on the incoming raw water quality parameters and the current chemical feed rates. If any of the plant effluent parameters are out of the desired range, the chemical feeds could be manipulated to bring the parameter within the desired range. The plant control could be individual feedback control loops for controlling the effluent turbidity from each unit operation. According to preferred embodiments of the present invention, the incoming water quality would be used for running the system model and predicting performance of each unit operation for all the modeled parameters. The predicted values would be compared with the set points values and the control parameters changed to bring the performance of each individual unit operation within the set point values established for that unit operation and reduce excursions from the individual unit operations and the plant effluent. This is a very important advantage and development given the complex and sometimes conflicting requirements of different water regulations. In addition, an expert system can handle legal requirements and communicate to maintain compliance with pertinent water quality regulations. FIG. 18 shows performance of a preferred embodiment of an apparatus that controls and monitors turbidity such as the effluent turbidity of an upflow clarifier, which is shown as upflow clarifier 1 of the UIWTP 100.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for controlling a water treatment plant, comprising:

a receiver unit that receives sensor information from the water treatment plant;

a neural network;

a monitoring unit coupled to the neural network and the receiver unit;

a prediction unit coupled to the monitoring unit and the neural network;

a modeling unit coupled to the monitoring unit and the neural network; and an output unit that outputs water quality parameters to the water treatment plant, wherein the monitoring unit, the prediction unit and the modeling unit can process sufficient parameters of the sensor information to predict water treatment plant operations and control the water treatment plant operations, wherein the monitoring unit modifies water treatment plant operations to determine treated material dispensing and system control rates to reduce the quantity of the treated material used to meet prescribed intermediate set points, wherein the sensor information includes the prescribed intermediate set points, wherein the monitoring unit modifies water treatment plant operations to meet the prescribed intermediate set points, and wherein the prescribed intermediate set points are values for water quality parameters including each of turbidity, pH, alkalinity, hardness, flow, ferric sulfate dose, and total organic carbon.

2. The apparatus of claim 1, wherein the water treatment plant comprises:

an intake unit that receives raw water; and a treatment plant that receives the raw water from the intake unit and outputs treated water having prescribed water characteristics, wherein the treatment plant comprises, a plurality of unit operations that include a coagulation unit operation, a softener unit operation, a recarbonation unit operation and a filter unit operation a materials controller that includes a plurality of remote units, wherein each of the plurality of remote units corresponds to one of the unit operations, and a sensor controller that includes a plurality of sensor units, wherein each of the plurality of sensor units corresponds to one of the unit operations, and wherein the neural network uses a general regression neural network.

3. The apparatus of claim 2, wherein the coagulation unit operation comprises:

a power mixer unit;

a rapid mix basin; and a sedimentation basin, wherein the coagulation unit operation receives the raw water and outputs first intermediate treated water to the softener unit operation.

4. The apparatus of claim 1, wherein the sensor information includes prescribed intermediate set points, wherein the prescribed intermediate set points represent a set of regulatory requirements, and wherein satisfying said set of prescribed intermediate points indicates compliance with said regulatory requirements.

5. The apparatus of claim 4, wherein the water treatment plant operations include each of turbidity, pH, alkalinity, hardness, flow, ferric sulfate dose, and total organic carbon.

6. The apparatus of claim 1, wherein the monitoring unit, the prediction unit and the modeling unit can virtually sense operational parameters that cannot be determined on-line, modify a selected one of a plurality of chemical feeds, estimate an effect of said modification throughout the plant for each of a plurality of physical or chemical operational parameters, and predict plant operation based on said modification.

7. The apparatus of claim 6, wherein the monitoring unit controls a straight-line unit operation that receives an input water, controls an upflow clarifier unit operation that receives output water from the straight-line unit operation, controls a recarbonation unit operation that receives output water from the upflow clarifier unit operation, and controls a filter unit operation that receives output water from a recarbonation unit operation to output the treated water, and wherein each unit operations can control corresponding ones of said water treatment plant operations according to said neural network, and predict each of the corresponding ones of said water treatment plant operations according to said neural network.

8. The apparatus of claim 1, wherein the monitoring unit controls a straight-line unit operation that receives an input water, controls an upflow clarifier unit operation that receives output water from the straight-line unit operation, controls a recarbonation unit operation that receives output water from the upflow clarifier unit operation, and controls a filter unit operation that receives output water from the recarbonation unit operation to output a treated water, and wherein each unit operations can control corresponding ones of said water treatment plant operations according to said neural network and predict each of the corresponding ones of said water treatment plant operations according to said neural network.

9. A method for water treatment comprising:
training with historical operational data;
developing neural network equations to predict present and future operations;
treating received input water using a water treatment plant comprising a plurality of unit operations to output treated water;
modifying operations of the unit operations to meet predetermined intermediate set points;
virtually sensing operational parameters that cannot be determined on-line;
modifying a selected one of a plurality of chemical feeds;
estimating an effect of said modification throughout the plant for physical or chemical parameters; and
predicting plant operation based on said modification.

10. The method of claim 9, wherein the predetermined intermediate set points represent a set of regulatory requirements, and wherein satisfying the set of predetermined intermediate points indicates compliance with said regulatory requirements.

11. The method of claim 10, further comprising outputting warning alerts for each of the regulatory requirements, wherein said predetermined intermediate set points include raw material intake, component operation performance measurements and processed material output, and wherein said virtually sensed operational parameters are monitored based on said historical operational data.

12. The method of claim 9, further comprising:
predicting performance operations for each of the unit operations; and
optimizing chemical feeds for said each of the unit operations.

13. The method of claim 9, further comprising proactively controlling of said predetermined intermediate set points for each of the unit operations.

14. The method of claim 9, wherein each of the unit operations perform a plurality of water treatment operations, further comprising:
controlling the treating step using the neural network equations; and
predicting each of the water treatment operations of the unit operations using the neural network equations.

15. The method of claim 14, wherein the treating step comprises:
controlling a straight-line unit operation that receives the input water;
controlling an upflow clarifier unit operation that receives output water from the straight-line unit operation;
controlling a recarbination unit operation that receives output water from the upflow clarifier unit operation; and
controlling a filter unit operation that receives output water from the recarbination unit operation to output the treated water.

16. The method of claim 15, wherein the developing neural network equations step comprises:
dividing unit operation data into a plurality of data sets;
selecting one of a plurality of candidate neural network models;
modifying an activation function to increase predictive performance of the unit operations;
modifying a weighting function to increase the predictive performance;
modifying a neural network architecture to increase the predictive performance;
performing genetic modeling optimizations to increase the predictive performance;
repeatedly executing the selecting through the performing steps for each of the candidate neural network models; and
comparatively analyzing the predictive performance for each of the neural network models to effectively perform the controlling and predicting steps.

17. A method for water treatment comprising:
training with historical operational data;
developing neural network equations to predict present and future operations;
treating received input water using a water treatment plant comprising a plurality of unit operations to output treated water, and wherein the treating step comprises,
controlling a straight-line unit operation that receives the input water,
controlling an upflow clarifier unit operation that receives output water from the straight-line unit operation,
controlling a recarbonation unit operation that receives output water from the upflow clarifier unit operation, and
controlling a filter unit operation that receives output water from the recarbonation unit operation to output the treated water; and
modifying operations of the unit operations to meet predetermined intermediate set points, wherein each of the unit operations perform a plurality of water treatment operations, further comprising,
controlling the treating step using the neural network equations, and
predicting each of the water treatment operations of the unit operations using the neural network equations.

18. The method of claim 17, wherein the developing neural network equations step comprises:
dividing unit operation data into a plurality of data sets;
selecting one of a plurality of candidate neural network models;

modifying an activation function to increase predictive performance of the unit operations;

modifying a weighting function to increase the predictive performance;

modifying a neural network architecture to increase the predictive performance;

performing genetic modeling optimizations to increase the predictive performance;

repeatedly executing the selecting through the performing steps for each of the candidate neural network models; and comparatively analyzing the predictive performance for each of the neural network models to effectively perform the controlling and predicting steps.

* * * * *